United States Patent

Togino

[11] Patent Number: 6,034,823
[45] Date of Patent: Mar. 7, 2000

[54] DECENTERED PRISM OPTICAL SYSTEM

[75] Inventor: Takayoshi Togino, Koganei, Japan

[73] Assignee: Olympus Optical Co., Ltd., Tokyo, Japan

[21] Appl. No.: 08/805,465

[22] Filed: Feb. 25, 1997

[30] Foreign Application Priority Data

Feb. 7, 1997 [JP] Japan .................................. 9-025134
Feb. 7, 1997 [JP] Japan .................................. 9-025135

[51] Int. Cl.[7] .............................. G02B 27/14; G02B 5/04
[52] U.S. Cl. ........................ 359/629; 359/631; 359/633; 359/834
[58] Field of Search ..................... 359/629, 630, 359/631, 633, 833, 834, 720, 668, 669, 726, 730, 732

[56] References Cited

U.S. PATENT DOCUMENTS

| 4,322,135 | 3/1982 | Freeman . | |
|---|---|---|---|
| 4,563,061 | 1/1986 | Ellis . | |
| 4,775,217 | 10/1988 | Ellis . | |
| 4,874,214 | 10/1989 | Cheysson et al. . | |
| 4,948,558 | 8/1990 | Skinner et al. . | |
| 5,019,338 | 5/1991 | Oishi et al. . | |
| 5,459,612 | 10/1995 | Ingleton | 359/633 |
| 5,689,736 | 11/1997 | Okuyama et al. | 359/630 |
| 5,699,194 | 12/1997 | Takahashi | 359/633 |
| 5,701,202 | 12/1997 | Takahashi | 359/631 |
| 5,703,605 | 12/1997 | Takahashi et al. | 359/630 |
| 5,706,136 | 1/1998 | Okuyama et al. | 359/631 |
| 5,751,494 | 5/1998 | Takahashi | 359/630 |
| 5,768,025 | 6/1998 | Togino et al. | 359/633 |
| 5,815,326 | 9/1998 | Takahashi . | |
| 5,875,056 | 2/1999 | Takahashi . | |

FOREIGN PATENT DOCUMENTS

| 583 116 | 2/1994 | European Pat. Off. . |
|---|---|---|
| 687932 | 12/1995 | European Pat. Off. . |
| 722106A2 | 7/1996 | European Pat. Off. . |
| 730169A2 | 9/1996 | European Pat. Off. . |
| 730183A2 | 9/1996 | European Pat. Off. . |
| 744643A2 | 11/1996 | European Pat. Off. . |
| 3-101709 | 4/1991 | Japan . |
| 7-333551 | 12/1995 | Japan . |
| 8-234137 | 9/1996 | Japan . |
| 8-313829 | 11/1996 | Japan . |
| 8-320452 | 12/1996 | Japan . |

Primary Examiner—Ricky D. Shafer
Attorney, Agent, or Firm—Pillsbury Madison & Sutro LLP

[57] ABSTRACT

A decentered prism optical system has a first surface at a side thereof closer to a pupil. The first surface has a transmitting or reflecting action and also has a wide effective area. The first surface is formed from a rotationally symmetric spherical or aspherical surface. The optical system has at least three surfaces (3, 4 and 5), and the space between these surfaces (3 to 5) is filled with a transparent medium having a refractive index larger than 1.3. A bundle of light rays from an object first passes through a pupil (1) of the optical system (7) along an optical axis (2) and enters the optical system (7) through a first surface (3) having both transmitting and reflecting actions. The incident light rays are reflected toward the pupil (1) by a second surface (4) which is at a side of the optical system (7) remote from the pupil (1) and which has only a reflecting action. The reflected light rays are then reflected away from the pupil (1) by the first surface (3). The reflected light rays pass through a third surface (5) having only a transmitting action, and reach an image plane (6) to form an image thereon. The first surface (3) is a rotationally symmetric surface, e.g. a spherical surface, and the second surface (4) is a rotationally asymmetric surface.

33 Claims, 13 Drawing Sheets

DECENTERED PRISM OPTICAL SYSTEM

BACKGROUND OF THE INVENTION

1. Field of the Invention

The present invention relates to a decentered prism optical system and, more particularly, to a decentered prism optical system of excellent productivity which can be applied to an ocular optical system or an imaging optical system.

2. Discussion of Related Art

Examples of conventionally known decentered prism optical systems include those disclosed in Japanese Patent Application Unexamined Publication (KOKAI) Nos. 7-333551 and 8-234137. The present applicant has also proposed decentered prism optical systems in Japanese Patent Application Unexamined Publication (KOKAI) Nos. 8-320452 and 8-313829. Any of these known decentered prism optical systems uses a rotationally asymmetric surface configuration for a surface having a reflecting action.

In these references, a first surface which is disposed at a side closer to a pupil and which has both transmitting and reflecting actions is formed from a rotationally asymmetric surface, and a second surface which is disposed at a side remote from the pupil and which has only a reflecting action is also formed from a rotationally asymmetric surface, e.g. an anamorphic surface or a toric surface. Therefore, when measurement is performed to see whether or not surface configurations have been finished in conformity to the design values to produce a desired optical system, surface accuracies cannot be measured by an interferometric or other similar method because of rotational asymmetry, and it is necessary to carry out measurement by using a three-dimensional coordinate measuring device. However, a typical three-dimensional coordinate measuring device measures coordinates of points in a point-by-point manner and therefore suffers from the problems that no sufficient measuring accuracy can be attained, and that measurement takes a great deal of time.

Further, the above-described prior art discloses that a third surface having only a transmitting action is designed to be a rotationally symmetric surface. However, the third surface, which has only a transmitting action, has a narrow effective surface area. Therefore, it is difficult to judge from only the third surface whether or not the whole optical system has been produced with the correct configuration. The first surface, which is closer to the pupil and has both reflecting and transmitting actions, has a large effective surface area. Therefore, it is convenient if the first surface is used as a reference for judgment as to whether the whole optical system is distorted or not. In injection molding of a plastic material, it is particularly important to minimize a change in the overall configuration of the optical system, and it is an effective way in mass-production to estimate the overall configuration of the optical system by measuring a surface having a large effective surface (i.e. an area that performs at least one of transmission or reflection of a bundle of light rays in the entire area of the surface).

SUMMARY OF THE INVENTION

In view of the above-described problems associated with the prior art, an object of the present invention is to provide a decentered prism optical system wherein a first surface disposed at a side of the optical system closer to a pupil, which has both transmitting and reflecting actions and also has a wide effective area, is formed from a rotationally symmetric spherical or aspherical surface.

To attain the above-described object, the present invention provides a decentered prism optical system having at least three surfaces which are decentered with respect to each other, wherein the space between the at least three surfaces is filled with a transparent medium having a refractive index not smaller than 1.3. At least two of the at least three surfaces of the optical system are reflecting surfaces arranged so that at least two internal reflections take place in the optical system. The at least two reflecting surfaces are disposed such that light rays reflected by these surfaces do not intersect each other in the optical system. One of the at least two reflecting surfaces is a rotationally asymmetric surface having no axis of rotational symmetry, neither intercepting the surface nor non-intercepting the surface, and at least one other of the reflecting surfaces is arranged such that at least an effective surface thereof (i.e. an area that transmits and/or reflects a bundle of light rays in the entire area of the surface) is formed from a rotationally symmetric surface having an axis of rotational symmetry in the effective surface.

The decentered prism optical system may include at least a first surface, a second surface, and a third surface. In this case, the rotationally symmetric surface is formed as the first surface having both a transmitting action through which a bundle of light rays enters the optical system or exits therefrom after passing through it, and a reflecting action by which the ray bundle is bent in the optical system. The rotationally asymmetric surface is formed as the second surface disposed to face the first surface. The third surface has a transmitting action through which the ray bundle exits from the optical system after passing through it, or enters it. The third surface is disposed to face in a direction approximately perpendicular to a direction in which the first and second surfaces face each other.

It is desirable that the first surface should be formed such that a transmitting region and a reflecting region overlap each other in at least a region of an effective surface thereof, and that at least the reflecting action taking place in the region of the effective surface of the first surface where the transmitting and reflecting regions overlap each other should be total reflection.

In addition, the present invention provides a decentered prism optical system having at least three surfaces decentered with respect to each other, wherein the space between the at least three surfaces is filled with a transparent medium having a refractive index not smaller than 1.3, and a bundle of light rays from the image plane is received to form an exit pupil. The optical system has at least a first surface formed from a rotationally symmetric surface that has both a transmitting action through which the ray bundle entering the optical system exits, and a reflecting action by which the ray bundle is bent in the optical system. The optical system has a second surface formed from a rotationally asymmetric surface disposed to face the first surface and that has an action by which the ray bundle entering the optical system is reflected toward the first surface in the system. A third surface is disposed to face the image plane and has an action through which the ray bundle from the image plane enters the optical system. The third surface is disposed to face in a direction approximately perpendicular to a direction in which the first and second surfaces face each other. The first surface has a convex surface directed toward the second surface. The first surface, the second surface and the third surface are arranged to constitute the optical system such that at least the ray bundle entering the optical system through the third surface passes through the inside of the optical system and is reflected by the first surface. The ray bundle reflected by the first surface passes through the inside of the optical system and is reflected by the second surface. The ray bundle reflected by the second surface exits from the first surface, which faces the second surface, toward the exit pupil. The first surface is tilted with respect to a straight line along which an axial principal ray passing through the center of the image plane of the optical system and reaching the center of the exit pupil travels after exiting from the first surface until it enters the exit pupil in a YZ-plane in which light rays are folded such that the distance from the exit pupil to the first surface in a direction parallel to the straight line is shorter at the image plane side of the straight line than at the side of the straight line remote from the image plane.

In addition, the present invention provides a decentered prism optical system having at least three surfaces decentered with respect to each other, wherein the space between the at least three surfaces is filled with a transparent medium having a refractive index not smaller than 1.3, and wherein a bundle of light rays from a pupil plane is received to form an image plane. The optical system has at least a first surface formed from a rotationally symmetric surface disposed to face the pupil plane and having both a transmitting action through which the bundle of light rays from the pupil plane enters the optical system and a reflecting action by which the ray bundle is bent in the optical system; a second surface formed from a rotationally asymmetric surface disposed to face the first surface and having an action by which the ray bundle entering the optical system is reflected toward the first surface in the optical system; and a third surface disposed to face in a direction approximately perpendicular to a direction in which the first and second surfaces face each other and having a transmitting action through which the ray bundle entering the optical system exits toward the image plane. The first surface, the second surface and the third surface are arranged to constitute the optical system such that at least the ray bundle entering the optical system through the first surface is reflected by the second surface, which faces the first surface. The ray bundle reflected by the second surface is reflected by the first surface, which faces the second surface; and the ray bundle reflected by the first surface passes through the inside of the optical system and exits from the third surface toward the image plane. The first surface is tilted with respect to a straight line along which an axial principal ray passing through the center of the pupil plane of the optical system and reaching the center of the image plane travels after exiting from the pupil plane until it intersects the first surface in a YZ-plane in which light rays are folded such that the distance from the pupil plane to the first surface in a direction parallel to the straight line is shorter at the image plane side of the straight line than at the side of the straight line remote from the image plane.

The reasons for adopting the above-described arrangements in the present invention, together with the functions thereof, will be described below.

First of all, the principle of the decentered prism optical system according to the present invention will be described with reference to FIG. 1, which illustrates an optical ray trace of a three-surface prism, which has the simplest arrangement in the present invention, for the purpose of facilitating the understanding of the subject matter of the present invention. In the case of FIG. 1, surfaces disposed along the optical path of a decentered prism optical system 7 consist essentially of three surfaces 3, 4 and 5. In the optical system 7, a bundle of light rays from an object (not shown) first passes through a pupil 1 of the optical system 7 and enters the optical system 7 through a first surface 3 having both a transmitting action and a reflecting action. The incident light rays are reflected toward the pupil 1 by a second surface 4 which is disposed at a side of the optical system 7 remote from the pupil 1 and which has only a reflecting action. The reflected light rays are then reflected away from the pupil 1 by the first surface 3, which is disposed at a side of the optical system 7 closer to the pupil 1 and has both transmitting and reflecting actions. The reflected light rays pass through a third surface 5 which is disposed to face in a direction (Y-axis direction in the figure) approximately perpendicular to a direction (Z-axis direction in the figure) in which the first surface 3 and the second surface 4 face each other, and which has only a transmitting action, and reach an image plane 6 to form an image thereon. It should be noted that reference numeral 2 denotes an optical axis.

Thus, in the present invention, the surface numbers of the optical system are put in the order of tracing from the pupil 1 toward the image plane 6, as a general rule.

It should, however, be noted that the arrangement shown in FIG. 1 is merely an example, and that the decentered prism optical system 7 according to the present invention may be arranged such that it has four optical surfaces, or the number of reflections is larger than two, as shown in FIGS. 2(a) and 2 (b). FIG. 2(a) shows a decentered prism optical system 7 having four surfaces, i.e. a fourth surface 8 in addition to the first surface 3, the second surface 4, and the third surface 5. The fourth surface 8, which has a reflecting action, may be a rotationally symmetric spherical surface or a rotationally symmetric aspherical surface. However, it is desirable to form the fourth surface 8 from an anamorphic surface or a rotationally asymmetric aspherical surface having only one plane of symmetry. FIG. 2(b) shows an example in which an identical surface is used to form both the first surface 3 and the third surface 5.

It is preferable that, of the at least three surfaces constituting the decentered prism optical system, the first surface, which is disposed at the pupil side of the optical system and has both a transmitting action and a reflecting action, should be formed from a rotationally symmetric surface, and the second surface, which is disposed at the side of the optical system remote from the pupil and has only a reflecting action, should be formed from a rotationally asymmetric surface.

The reason for this is as follows: Assuming that a light ray emanating from the center of the object and passing through the pupil center to reach the center of the image plane is an axial principal ray, a point at which the axial principal ray is reflected by the first surface, which has both transmitting and reflecting actions, has a weaker refracting power than that of a point at which the axial principal ray is reflected by the second surface, which has only a reflecting action. Therefore, the amount of decentration aberration produced by the first surface owing to the decentration thereof is basically small, so that even if this surface is formed from a rotationally symmetric surface, the decentration aberrations can be corrected by another surface.

Incidentally, the first surface 3 can be formed from a rotationally symmetric spherical surface or a rotationally symmetric aspherical surface, and if it is formed from a rotationally symmetric aspherical surface, it is desirable to satisfy the following condition (0-1) from the viewpoint of correcting decentration aberrations and chromatic aberrations with good balance:

$$5° < \alpha < 30°  \quad (0\text{-}1)$$

where $\alpha$ is, as shown in FIG. 1, an angle of intersection between the optical axis 2 and a rotation center axis 12 passing through the center (vertex) of the rotationally symmetric aspherical surface.

If the angle α is not larger than the lower limit, i.e. 5°, the tilt of the first surface 3 with respect to the optical axis 2 becomes excessively small, so that it becomes impossible to satisfactorily correct decentration aberrations produced by the second surface 4. Consequently, it becomes necessary to form the first surface 3 from a rotationally asymmetric surface from the viewpoint of aberration correcting performance. Conversely, if the angle α is not smaller than the upper limit, i.e. 30°, the tilt of the first surface 3 with respect to the optical axis 2 becomes excessively large. Consequently, a large chromatic dispersion is introduced into a ray bundle passing through the first surface 3 (when it enters or exits from the optical system 7), causing the optical performance to be degraded.

In the calculation of A, the rotation center axis 12 of a rotationally symmetric surface may be obtained by a line normal to a tangential line 11 at the center 10 in the YZ-plane (the section shown in FIG. 1). The definition of a coordinate system will be given later.

In a case where the first surface 3 is formed from a rotationally symmetric spherical surface, there is an infinite number of centers 10 on the first surface 3. In that case, a point 13 at which an axial principal ray traveling along the optical axis 2 is internally reflected by the first surface 3 is defined as a center 10, and an angle of intersection between the optical axis 2 and the rotation center axis 12 passing through the point 13 is defined as the angle α [α in the Examples described later is the same as α in the condition (0-1)].

It is desirable for the angle α to satisfy the following condition (0-2) from the viewpoint of forming a decentered prism optical system having an even more excellent optical performance:

$$5° < \alpha < 25° \quad (0\text{-}2)$$

It is more desirable to satisfy the following condition (0-3):

$$10° < \alpha < 20° \quad (0\text{-}3)$$

Next, a coordinate system used in the following description will be explained.

As shown in FIG. 1, a Z-axis is defined by a straight line which is coincident with the optical axis 2, (which) is an observer's visual axis when the decentered prism optical system is used as an ocular optical system) along which an axial principal ray passing through the center of the pupil 1 of the decentered prism optical system 7 and reaching the center of the image plane 6 (an image display device when the decentered prism optical system is used as an ocular optical system) travels after exiting from the pupil 1 until it intersects the first surface 3 of the decentered prism optical system 7. An axis perpendicularly intersecting the Z-axis in the decentration plane of each surface constituting the decentered prism optical system 7 is defined as a Y-axis. An axis perpendicularly intersecting both the Z- and Y-axes is defined as an X-axis. The center of the pupil 1 is defined as the origin of the coordinate system. The direction in which the axial principal ray emanates from the object point to reach the image plane is defined as the positive direction of the Z-axis. The direction in which the image plane 6 lies with respect to the optical axis 2 is defined as the positive direction of the Y-axis. A direction in which the X-axis constitutes a right-handed system in combination with the Y- and Z-axes is defined as the positive direction of the X-axis.

In general, it is difficult to produce a decentered prism optical system by polishing, and it is common practice to form constituent surfaces by grinding one by one or by injection molding of a plastic material or molding of a glass material. At this time, it is necessary to check to see whether or not each surface of the decentered prism optical system has been produced with a predetermined configuration. In measurement of a three-dimensional rotationally asymmetric configuration, a three-dimensional coordinate measuring device is generally used. However, it takes a great deal of time to measure with a three-dimensional coordinate measuring device. Therefore, such a measuring method is impractical.

It is important in the present invention that at least one of the at least-three surfaces constituting the decentered prism optical system should be formed from a rotationally symmetric surface.

It is more desirable to use a rotationally symmetric surface for the first surface 3, which is disposed at a side of the optical system closer to the pupil 1 and has both transmitting and internally reflecting actions, and which further has the widest effective area in the optical system and suffers relatively large aberrational deterioration. By doing so, it is possible to construct a decentered prism optical system that enables the finished condition of a surface configuration to be readily evaluated in a short period of time.

The decentered prism optical system according to the present invention will be described below as an image-forming optical system. It should be noted that the decentered prism optical system according to the present invention can be used as an ocular optical system by disposing the object point and the image point in reverse relation to the arrangement shown in FIG. 1 (i.e. an image display device is disposed in the image plane 6 shown in FIG. 1, and an observer's pupil is placed at the pupil 1). It is also possible to form an arrangement in which an image display device is disposed at the pupil 1, and an image of the image display device is observed from the image plane 6 side.

When X-, Y- and Z-axes are determined according to the above definition, six principal rays ① to ⑥ among those which emanate from the center of the pupil position and are incident on the image plane are determined by combinations of field angles in the directions X and Y, i.e. the field angle zero in the direction X, the maximum field angle in the direction X, the maximum field angle in the direction +Y, the field angle zero in the direction Y, and the maximum field angle in the direction −Y, as shown in Table 1 below:

TABLE 1

|  | Field angle zero in direction X | Maximum field angle in direction X |
|---|---|---|
| Maximum field angle in direction +Y | ① | ④ |
| Field angle zero in direction Y | ② | ⑤ |
| Maximum field angle in direction −Y | ③ | ⑥ |

As shown in Table 1: an axial principal ray in the center of the image field is defined as ②; a principal ray passing at the field angle zero in the direction X and at the maximum field angle in the direction +Y is defined as ①; a principal ray passing at the field angle zero in the direction X and at the maximum field angle in the direction −Y is defined by ③; a principal ray passing at the maximum field angle in the direction X and at the maximum field angle in the direction +Y is defined as ④; a principal ray passing at the maximum field angle in the direction X and at the field angle zero in the direction Y is defined as ⑤; and a principal ray passing at the maximum field angle in the direction X and at the maximum field angle in the direction −Y is defined as ⑥. An area where the principal rays ① to ⑥ intersect each particular surface is defined as an effective area. An equation which defines the configuration of each particular surface in the effective area [i.e. an expression in which the Z-axis is expressed as an axis of the surface, or an expression in which the surface is expressed in the form of Z=f(X,Y) on the assumption that the surface is not decentered] is solved to determine each of curvatures Cy1 to Cy6 of the surface in a direction parallel to the Y-axis, which corresponds to the direction of decentration of the surface, in a plane containing a line normal to the surface at each of positions where the principal rays ① to ⑥ strike the surface. The curvature of the surface in the direction of the X-axis, which perpendicularly intersects the Y-axis, in a plane containing a line normal to the surface at each of the six positions is also determined, and the curvatures in the X-axis direction are denoted by Cx1 to Cx6, respectively.

First, conditions concerning the focal length of the second surface, which has only a reflecting action, with respect to the overall focal length of the optical system according to the present invention will be shown. The second surface in the present invention, which has only a reflecting action, is characterized in that it is decentered and has a rotationally asymmetric surface configuration having no axis of rotational symmetry, neither intercepting nor non-intercepting the surface. Therefore, it is meaningless to deduce the focal length from a paraxial calculation. Accordingly, the focal length is defined as follows.

Ray tracing is carried out with respect to a light ray which passes through a point that is a slight distance H (millimeter) away from the pupil center in the X-axis direction parallel to an axial principal ray emanating from the center of the object point and passing through the center of the entrance pupil of the optical system, and which enters the optical system parallel to the axial principal ray. A value obtained by dividing the distance H by the NA of the light ray exiting from the optical system (i.e. the value of the sine of the angle formed between the light ray and the axial principal ray) is defined as the focal length Fx (millimeter) in the direction X of the entire optical system. Further, a light ray which passes through a point that is the distance H (millimeter) away from the pupil center in the direction Y, and which enters the optical system parallel to the axial principal ray is traced, and a value obtained by dividing the distance H by the NA of the light ray exiting from the optical system (i.e. the value of the sine of the angle formed between the light ray and the axial principal ray) is defined as the focal length Fy (millimeter) in the direction Y of the entire optical system.

Assuming that Fx/Fy is FA, it is important to satisfy the following condition:

$$0.7 < FA < 1.3 \tag{A-1}$$

This condition relates to the aspect ratio (length-to-width) of the image. If FA is not larger than the lower limit of the condition (A-1), i.e. 0.7, the image decreases in size in the direction X. Consequently, when a square object is imaged, a rectangular image longer in the vertical (lengthwise) direction is undesirably formed. If FA is not smaller than the upper limit of the condition (A-1), i.e. 1.3, a square object is imaged undesirably as a rectangular image that is longer in the horizontal (breadthwise) direction. The most desirable value of FA is 1, as a matter of course. However, it is important in order to correct image distortion to make a correction with good balance within the range defined by the condition (A-1) in which FA deviates from 1 in view of the relationship to the higher-order coefficients of the surface.

It is more desirable to satisfy the following condition:

$$0.8 < FA < 1.2 \tag{A-2}$$

Regarding the relationship between the refracting powers Pxn and Pyn in the directions X and Y of the second surface, which has only a reflecting action, at a position where the second surface is struck by an axial principal ray emanating from the center of the object point and passing through the center of the pupil, and the refracting powers Px and Py in the directions X and Y of the entire optical system, which are the reciprocals of the focal lengths Fx and Fy, it is desirable to satisfy either of the following conditions (B-1) and (C-1):

$$0.8 < |PxB| < 1.3 \tag{B-1}$$

$$0.8 < |PyC| < 1.3 \tag{C-1}$$

where PxB is Pxn/Px, and PyC is Pyn/Py.

If |PXB| or |PyC| is not larger than the lower limit of these conditions, i.e. 0.8, the power in either of the directions X and Y of the reflecting surface as the second surface, which has only a reflecting action, becomes excessively smaller than the power of the entire optical system, and another surface must bear a necessary power. This is undesirable from the viewpoint of aberration correction.

If |PXB| or |PyC| is not smaller than the upper limit of these conditions, i.e. 1.3, the power of the reflecting surface as the second surface becomes excessively strong, and it becomes impossible to correct, with good balance, image distortion and field curvature produced by the second surface.

It is more desirable to satisfy both the conditions (B-1) and (C-1).

The following is a description of a condition concerning the surface curvature of the second surface, which has only a reflecting action, at a position where the axial principal ray strikes the second surface. This condition is necessary to satisfy in order to minimize astigmatism produced by the second surface. Assuming that Cx2 and Cy2 are the curvatures of the second surface in the directions X and Y, respectively, in respective planes containing a line normal to the second surface at a position where the axial principal ray strikes the second surface, and the ratio Cx2/Cy2 is denoted by CxyD, it is important to satisfy the following condition:

$$0.8 < CxyD < 1.2 \tag{D-1}$$

The second surface, which has only a reflecting action, is a decentered surface. If this surface is formed from a rotationally symmetric surface, various aberrations, including image distortion, astigmatism, and coma, occur to a considerable extent, and it is impossible to favorably correct these aberrations. For this reason, it is important to form the second surface, which has only a reflecting action, from a rotationally asymmetric surface. If the second surface is formed from a rotationally symmetric surface, astigmatism produced by this surface becomes excessively large that it cannot be corrected by another surface. Therefore, in order to correct these aberrations, the second surface, which has only a reflecting action, is formed from a surface having only one plane of symmetry, and moreover, the above condition (D-1) is satisfied. By doing so, various aberrations are favorably corrected. Moreover, it becomes possible to obtain or observe an image free from astigmatism even on the axis.

The lower limit of the condition (D-1), i.e. 0.8, and the upper limit thereof, i.e. 1.2, are limits within which astigmatism can be prevented from occurring to a considerable extent.

It is more desirable to satisfy the following condition:

$$0.95 < CxyD < 1.1 \tag{D-2}$$

It is still more desirable to satisfy the following condition:

$$1 < CxyD < 1.05 \tag{D-3}$$

The second surface, which has only a reflecting action, produces different aberrations for each image position. Therefore, each aberration must be corrected by changing the configuration of the reflecting surface. The amount of aberration subtly varies according to the position on the reflecting surface. Accordingly, it is important to satisfy the following conditions.

Let us assume that the curvature in the direction X of that portion of the second surface having only a reflecting action at which the axial principal ray ② is reflected by the second surface is Cx2; the curvature in the direction X of the effective area at each of positions where the maximum field angle principal rays ①,③ to ⑥ strike each surface is denoted by Cxn (n is 1, 3 to 6); of values each obtained by dividing the difference Cxn–Cx2 by the power Px in the direction X of the entire optical system, i.e. (Cxn–Cx2)/Px, the maximum value is denoted by CxMaxE, and the minimum value is denoted by CxMinE; and of values each obtained by dividing the Y-direction curvature difference Cyn–Cy2 by the power Py in the direction Y of the entire optical system, i.e. (Cyn–Cy2)/Py, the maximum value is denoted by CyMaxF, and the minimum value is denoted by CyMinF. On this assumption, it is desirable from the viewpoint of aberration correction to satisfy either of the following two pairs of conditions (E-1) and (E-1') or (F-1) and (F-1'):

$$-0.05 < CxMinE \text{ (1/millimeter)} \tag{E-1}$$

$$CxMaxE < 0.05 \text{ (1/millimeter)} \tag{E-1'}$$

$$-0.1 < CyMinF \text{ (1/millimeter)} \tag{F-1}$$

$$CyMaxF < 0.1 \text{ (1/millimeter)} \tag{F-1'}$$

If CxMinE or CyMinF is not larger than the lower limit of the condition (E-1) or (F-1), or CxMaxE of CyMaxF is not smaller than the upper limit of the condition (E-1') or (F-1'), the curvatures in the effective area become excessively different from each other, resulting in an excessively large variation in the curvature of the entire effective area of the second surface, which has the strongest refracting power in the optical system. Consequently, it becomes impossible to obtain or observe an image which is wide and flat over the entire field angle range.

In a case where the field angle exceeds 30°, it is more desirable to satisfy all of the following conditions:

$$-0.03 < CxMinE \text{ (1/millimeter)} \tag{E-2}$$

$$CxMaxE < 0.015 \text{ (1/millimeter)} \tag{E-2'}$$

$$-0.08 < CyMinF \text{ (1/millimeter)} \tag{F-2}$$

$$CyMaxF < 0.07 \text{ (1/millimeter)} \tag{F-2'}$$

It is still more desirable to satisfy both the above two sets of conditions at the same time.

Assuming that CyG denotes a value obtained by dividing the difference between the curvatures in the direction Y of the second surface at the upper and lower edges of the effective area, i.e. Cy1–Cy3, by Py, it is important to satisfy the following condition:

$$-0.05 < CyG < 0.5 \tag{G-1}$$

This condition is necessary to satisfy in order to favorably correct vertical image distortions at the upper and lower edges of the image field. If CyG is not larger than the lower limit of the condition (G-1), i.e. –0.05, the magnification at the lower edge of the image field becomes undesirably small. If CyG is not smaller than the upper limit, i.e. 0.5, the magnification in the Y (vertical) direction on the image field becomes undesirably small in comparison to other portions of the image field, and the image is unfavorably distorted. In particularly, in a decentered prism optical system wherein a first surface having both reflecting and transmitting actions is formed from a rotationally symmetric surface to improve the productivity as in the present invention, it is necessary in order to correct the image distortion by another surface to use the third surface, which is the closest to the image plane in the optical system and has only a transmitting action; otherwise, the image distortion cannot basically be corrected. However, the third surface, which has only a transmitting action, mainly corrects field curvature. Therefore, if the second surface, which has only a reflecting action, does not satisfy the condition (G-1), it will become impossible for the entire optical system to correct field curvature and image distortion simultaneously.

It is more desirable from the viewpoint of aberration correction to satisfy the following condition:

$$0 < CyG < 0.2 \tag{G-2}$$

It is still more desirable from the viewpoint of aberration correction to satisfy the following condition:

$$0 < CyG < 0.15 \tag{G-3}$$

Assuming that CxH denotes a value obtained by dividing the difference between the curvatures in the direction X of the second surface at the upper and lower edges of the effective area, i.e. Cx1–Cx3, by Px, it is important to satisfy the following condition:

$$-0.01 < CxH < 0.1 \tag{H-1}$$

This condition is also necessary to satisfy in order to favorably correct horizontal image distortions at the upper and lower edges of the image field. If CxH is not larger than the lower limit of the condition (H-1), i.e. –0.01, the magnification at the lower edge of the image field becomes undesirably small. If CxH is not smaller than the upper limit, i.e. 0.1, the magnification in the X (horizontal) direction on the image field becomes undesirably small in comparison to other portions of the image field, and the image is unfavorably distorted in a trapezoidal shape.

It is more desirable from the viewpoint of aberration correction to satisfy the following condition:

$$0 < CxH < 0.05 \tag{H-2}$$

It is still more desirable from the viewpoint of aberration correction to satisfy the following condition:

$$0.01 < CxH < 0.05 \tag{H-3}$$

It is important that the third surface, which is disposed to face the image plane and has only a transmitting action, should satisfy the following conditions.

Suppose that the positive direction of the Y-axis of a coordinate system that defines the third surface having only a transmitting action [i.e. a coordinate system in a case where the Z-axis is expressed as an axis of the surface, and the surface is expressed in the form of Z=f(X,Y)] is taken in a direction toward the pupil, it is desirable that the Y-direction curvature in the negative direction of the Y-axis should become larger in the negative direction than the Y-direction curvature in the positive direction of the Y-axis.

Assuming that the curvatures in the direction Y of those portions of the third surface through which the principal rays ① and ③ pass are denoted by Cy1 and Cy3, respectively, and a value obtained by dividing Cy1−Cy3 by Py is denoted by CyI, it is desirable from the viewpoint of aberration correction to satisfy the following condition:

$$0 < CyI < 5 \qquad (I\text{-}1)$$

In an optical system wherein a decentered reflecting surface has the principal power of the optical system as in the present invention, image distortion occurs owing to the decentration. An effective way of correcting the image distortion is to use the third surface, which has no large effect on aberrations. If CyI is not larger than the lower limit of the condition (I-1), i.e. 0, the Y-direction curvature in the negative direction of the Y-axis does not become larger in the negative direction than the Y-direction curvature in the positive direction of the Y-axis. Consequently, it becomes impossible to correct, with good balance, image distortion in the vertical direction of the image field produced by the second surface, which has only a reflecting action. If CyI is not smaller than the upper limit, i.e. 5, it is similarly impossible to favorably correct the image distortion in the vertical direction. Thus, image distortion due to decentration cannot satisfactorily be corrected.

It is more desirable from the viewpoint of obtaining an even more favorable result to satisfy the following condition:

$$0 < CyI < 2 \qquad (I\text{-}2)$$

Suppose that the positive direction of the Y-axis of a coordinate system that defines the third surface having only a transmitting action is taken in a direction toward the pupil, it is desirable that the X-direction curvature in the negative direction of the Y-axis should become larger in the negative direction than the X-direction curvature in the positive direction of the Y-axis.

Assuming that the curvatures in the direction X of those portions of the third surface through which the principal rays ① and ③ pass are denoted by Cx1 and Cx3, respectively, and a value obtained by dividing Cx1−Cx3 by Px is denoted by CxJ, it is desirable from the viewpoint of aberration correction to satisfy the following condition:

$$0 < CxJ < 1 \qquad (J\text{-}1)$$

If CxJ is not larger than the lower limit of the condition (J-1), i.e. 0, the X-direction curvature in the negative direction of the Y-axis does not become larger in the negative direction than the X-direction curvature in the positive direction of the Y-axis. Consequently, it becomes impossible to correct, with good balance, trapezoidal image distortion produced by the second surface, which has only a reflecting action. If CxJ is not smaller than the upper limit, i.e. 1, it is similarly impossible to favorably correct the trapezoidal image distortion. Thus, image distortion due to decentration cannot satisfactorily be corrected.

It is more desirable from the viewpoint of obtaining an even more favorable result to satisfy the following condition:

$$0 < CxJ < 0.3 \qquad (J\text{-}2)$$

Regarding the above conditions (0-1) to (J-2), it is preferable that the first surface, which has both reflecting and transmitting actions, should be formed from a rotationally symmetric surface, and the second surface, which has only a reflecting action, should be formed from a plane-symmetry three-dimensional surface which has no axis of rotational symmetry intercepting nor the surface, and which has only one plane of symmetry. The present invention is applicable not only to an arrangement in which the second surface is formed from such a plane-symmetry three dimensional surface, but also to an arrangement in which the second surface is formed from an anamorphic surface having no axis of rotational symmetry non-intercepting the surface, i.e. a rotationally asymmetric surface configuration having no axis of rotational symmetry in nor out of the surface.

Still other objects and advantages of the invention will in part be obvious and will in part be apparent from the specification.

The invention accordingly comprises the features of construction, combinations of elements, and arrangement of parts which will be exemplified in the construction hereinafter set forth, and the scope of the invention will be indicated in the claims.

DESCRIPTION OF THE PREFERRED EMBODIMENTS

Figure 1:
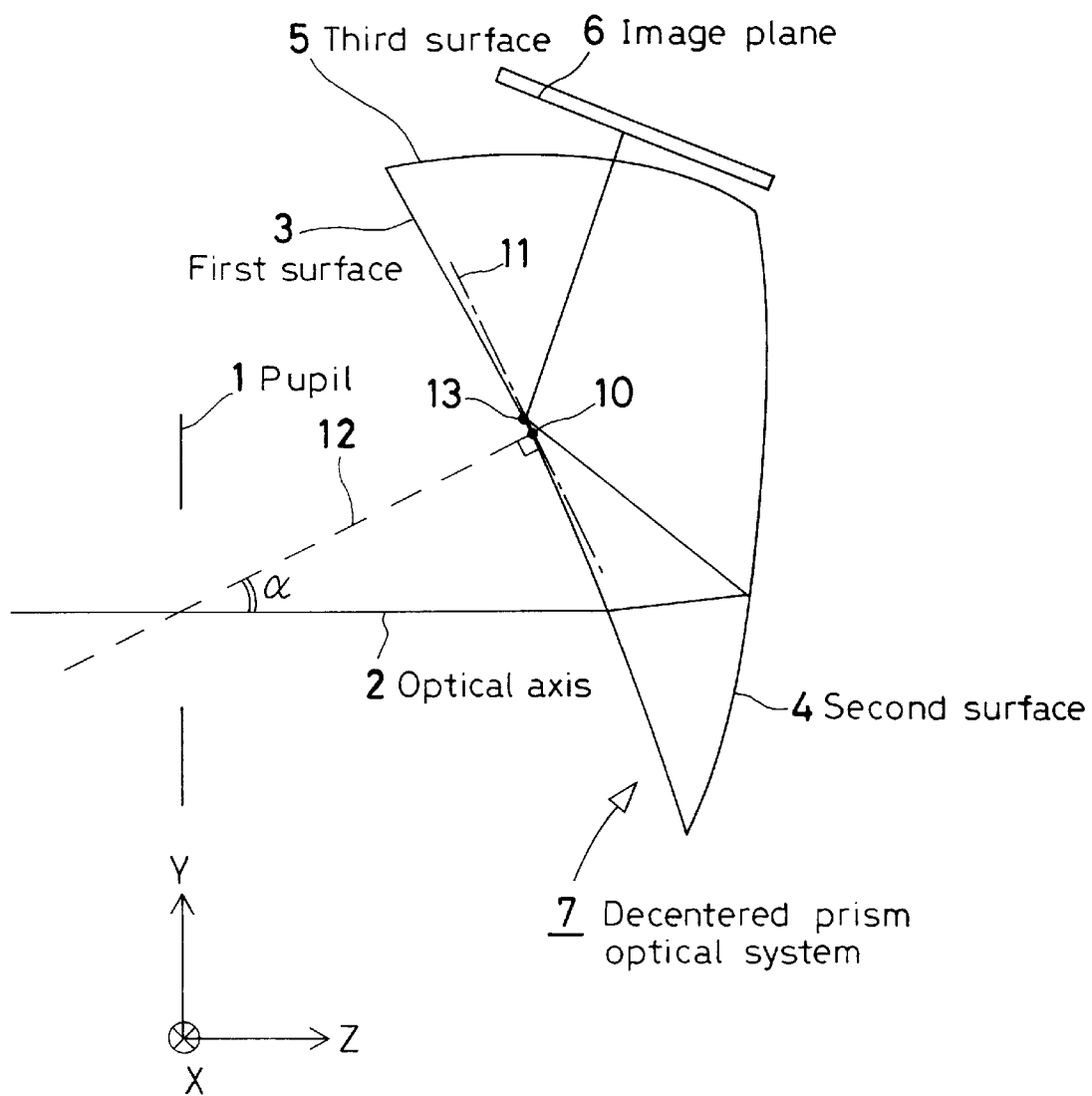
FIG. 1 is a ray path diagram illustrating the decentered prism optical system according to the present invention as arranged in the form of a three-surface prism.
Figure 2A:
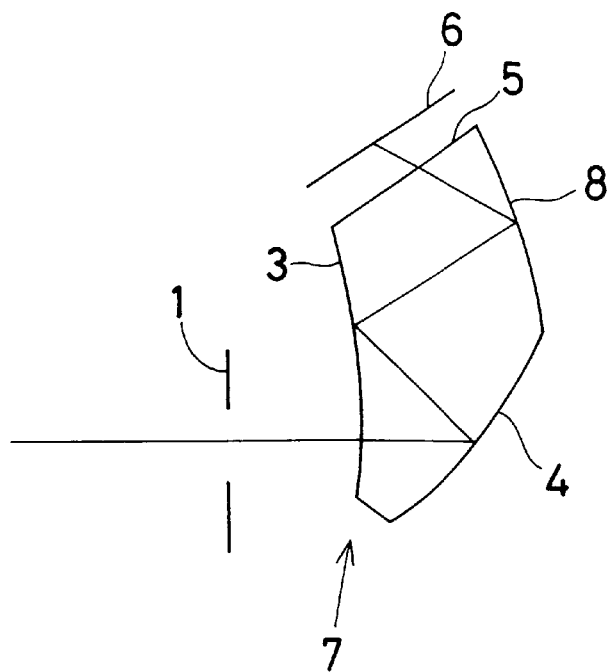
FIGS. 2(a) and 2(b) are ray path diagrams illustrating other arrangements of the decentered prism optical system according to the present invention.
Figure 2B:
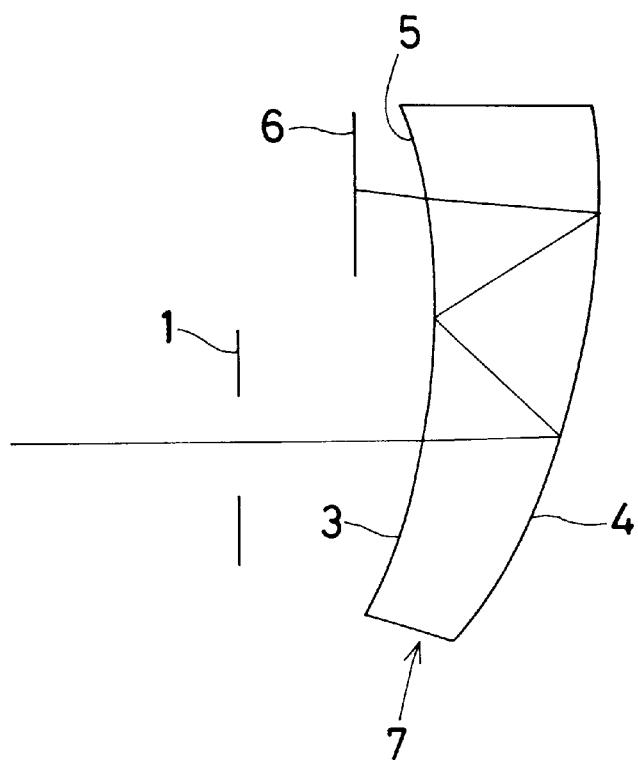
Figure 3:
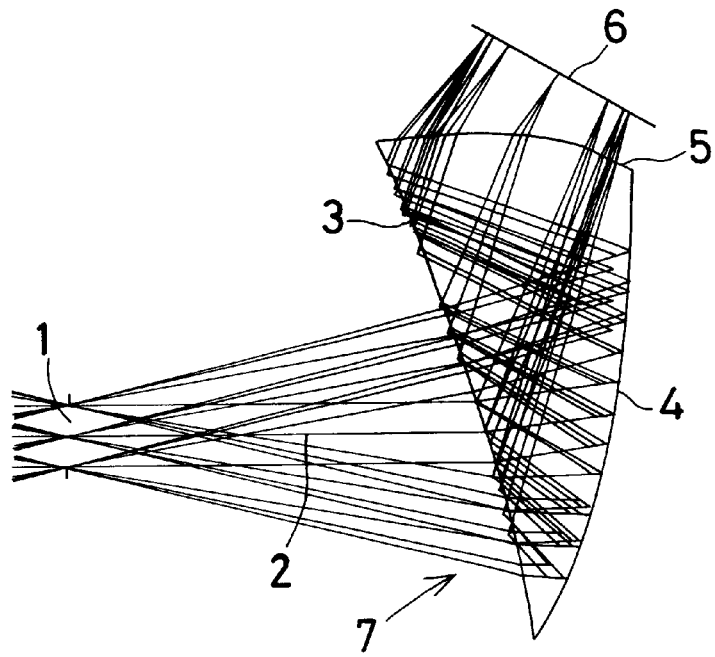
FIG. 3 is a sectional view of a decentered prism optical system according to Example 1 of the present invention.
Figure 4:
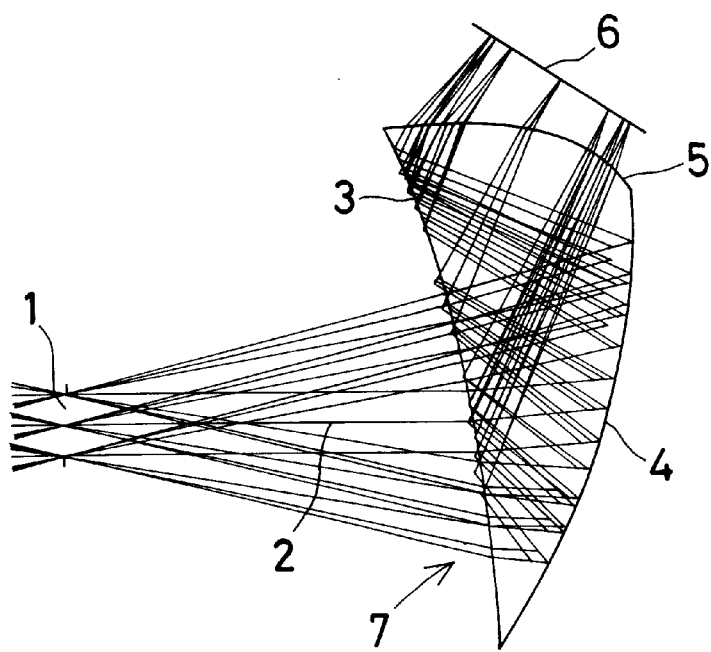
FIG. 4 is a sectional view of a decentered prism optical system according to Example 2 of the present invention.
Figure 5:
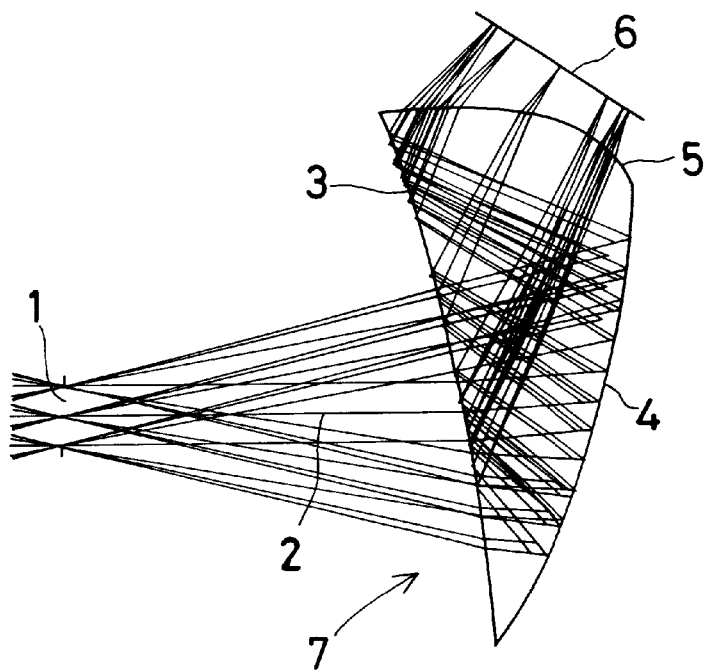
FIG. 5 is a sectional view of a decentered prism optical system according to Example 3 of the present invention.
Figure 6:
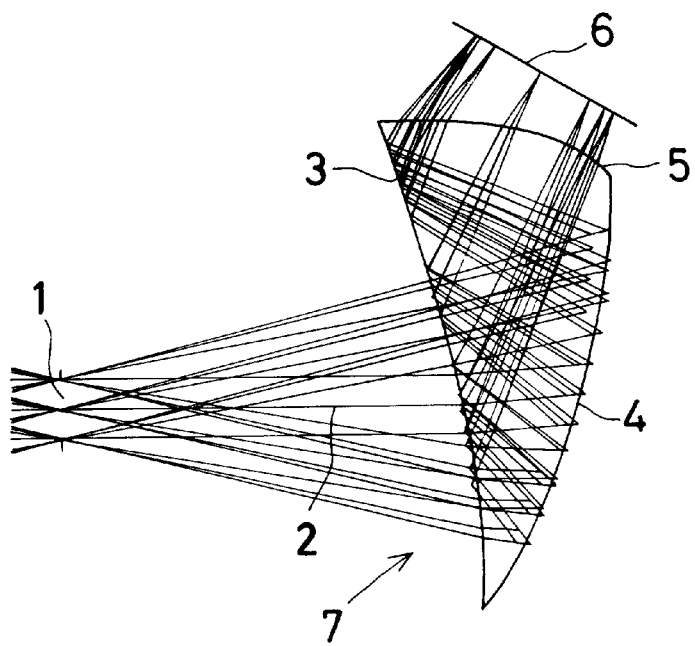
FIG. 6 is a sectional view of a decentered prism optical system according to Example 4 of the present invention.
Figure 7:
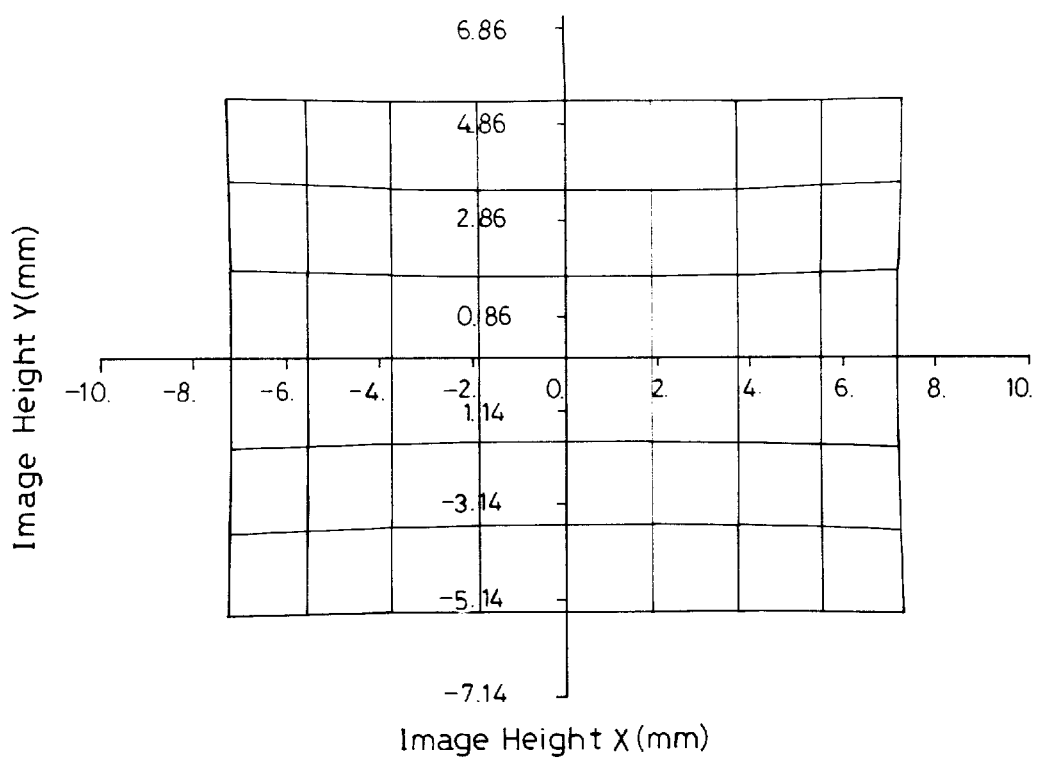
FIG. 7 is an aberrational diagram showing image distortion in Example 1.
Figure 8:
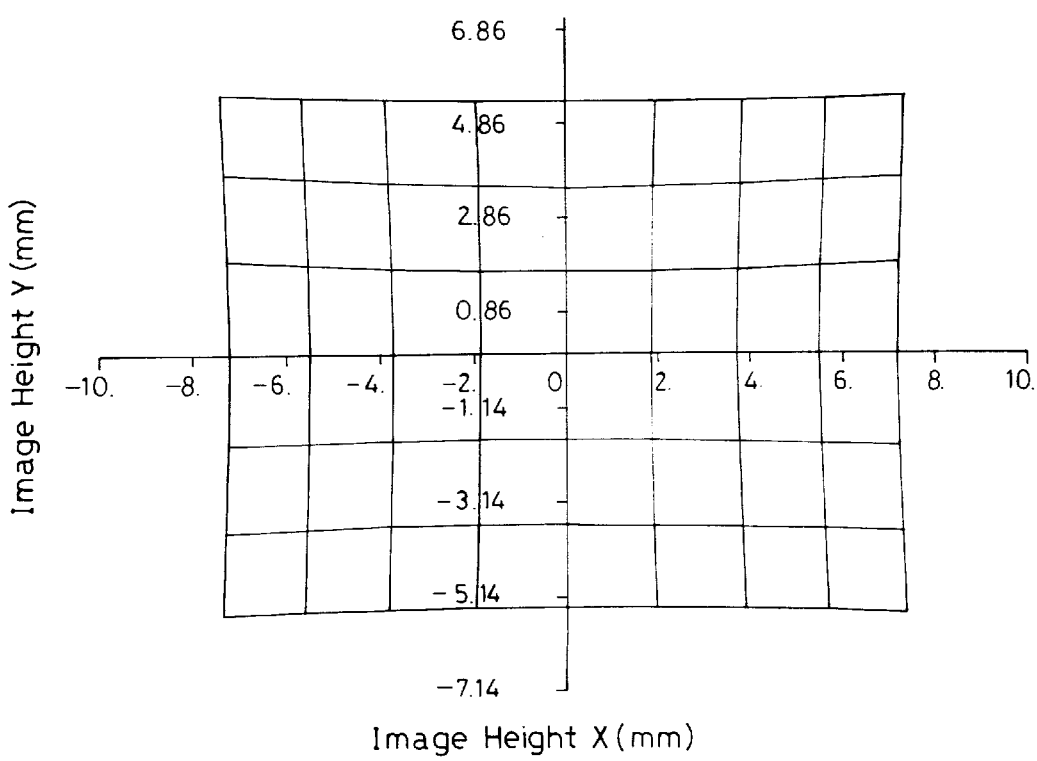
FIG. 8 is an aberrational diagram showing image distortion in Example 2.
Figure 9:
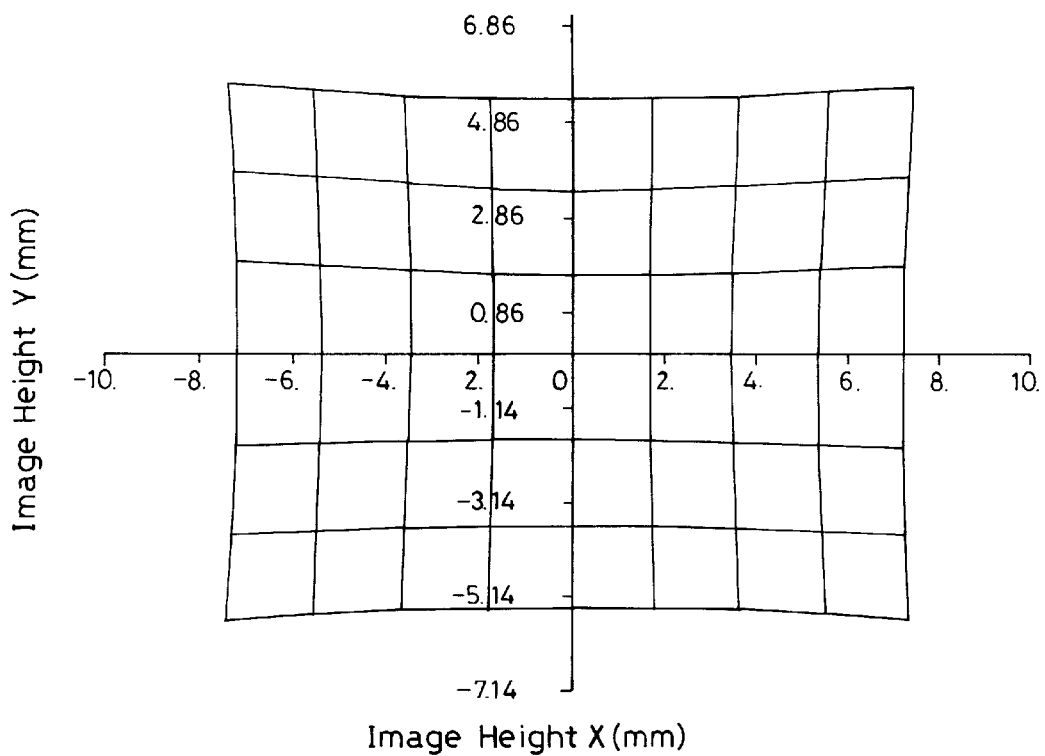
FIG. 9 is an aberrational diagram showing image distortion in Example 3.
Figure 10:
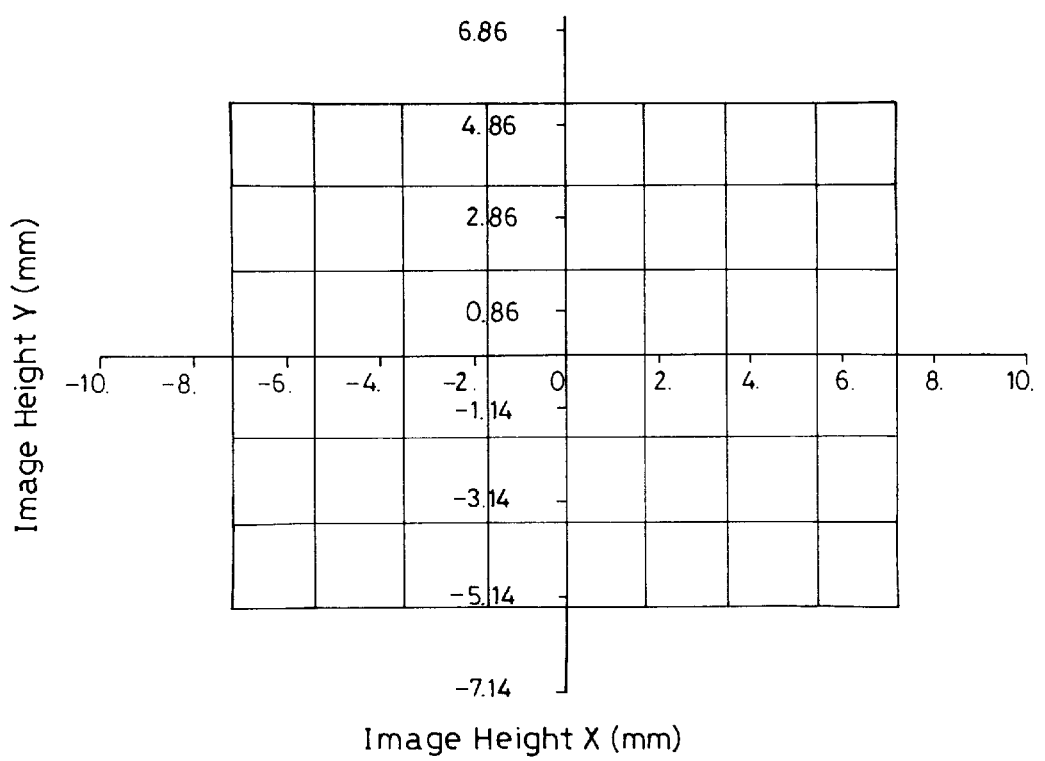
FIG. 10 is an aberrational diagram showing image distortion in Example 4.

Examples 1 to 4 of the decentered prism optical system according to the present invention will be described below. In constituent parameters of each example (described later), as shown in FIG. 1, the center of a pupil 1 of an optical system 7 is defined as the origin of the optical system. An optical axis 2 is defined by a light ray which emanates from the center of an object and passes through the center (origin) of the pupil 1. A Z-axis is taken in a direction in which light rays travel from the pupil 1 along the optical axis 2. A Y-axis is taken in a direction which extends through the center of the pupil 1 at right angles to the Z-axis in a plane in which light rays are bent by the optical system 7. An X-axis is taken in a direction which extends through the center of the pupil 1 at right angles to both the Y- and Z-axes. A direction in which the Z-axis extends from the pupil 1 toward the optical system 7 is defined as a positive direction of the Z-axis. A direction in which the Y-axis extends from the optical axis 2 toward an image plane 6 is defined as a positive direction of the Y-axis. A direction in which the X-axis constitutes a right-handed system in combination with the Y- and Z-axes is defined as a positive direction of the X-axis. It should be noted that ray tracing is carried out in a direction in which light rays enter the optical system 7 from the object side of the pupil 1 of the optical system 7.

Regarding decentered surfaces, each surface is given displacements in the X-, Y- and Z-axis directions of the vertex position of the surface from the center of the pupil 1, which is the origin of the optical system 7, and tilt angles of the center axis of the surface [the Z-axis in Eq.(b) shown below with respect to a three-dimensional surface] with respect to the X-, Y- and Z-axes ($\alpha$, $\beta$, and $\gamma$, respectively). In this case, positive $\alpha$ and $\beta$ mean counterclockwise rotation relative to the positive directions of the corresponding axes, and positive $\gamma$ means clockwise rotation relative to the positive direction of the Z-axis. In addition, the radius of curvature of each spherical surface, surface separation, refractive index of each medium, and Abbe's number are given according to the conventional method.

The configuration of an anamorphic surface is defined by the following equation. A straight line which passes through the origin of the surface configuration and which is perpendicular to the optical surface is defined as the axis of the anamorphic surface.

$$Z = (Cx \cdot X^2 + Cy \cdot Y^2)/[1 + \{1 - (1 + Kx)Cx^2 \cdot X^2 - (1 + Ky)Cy^2 \cdot Y^2\}^{1/2}] + \sum Rn\{(1 - Pn)X^2 + (1 + Pn)Y^2\}^{(n+1)}$$

Assuming that n=4 (polynomial of degree 4), for example, the equation, when expanded, may be given by:

$$Z = (Cx \cdot X^2 + Cy \cdot Y^2)/[1 + \{1 - (1 + Kx)Cx^2 \cdot X^2 - \quad (a)$$
$$(1 + Ky)Cy^2 \cdot Y^2\}^{1/2}] +$$
$$R1\{(1 - P1)X^2 + (1 + P1)Y^2\}^2 +$$
$$R2\{(1 - P2)X^2 + (1 + P2)Y^2\}^3 +$$
$$R3\{(1 - P3)X^2 + (1 + P3)Y^2\}^4 +$$
$$R4\{(1 - P4)X^2 + (1 + P4)Y^2\}^5$$

where Z is the amount of deviation from a plane tangent to the origin of the surface configuration; Cx is the curvature in the X-axis direction; Cy is the curvature in the Y-axis direction; Kx is the conical coefficient in the X-axis direction; Ky is the conical coefficient in the Y-axis direction; Rn is the rotationally symmetric component of the aspherical surface term; and Pn is the rotationally asymmetric component of the aspherical surface term. It should be noted that the radius of curvature Rx in the X-axis direction and the radius of curvature Ry in the Y-axis direction are related to the curvatures Cx and Cy as follows:

$$Rx=1/Cx, \quad Ry=1/Cy$$

The configuration of a rotationally asymmetric surface is defined by the following equation. The Z-axis of the defining equation is the axis of the rotationally asymmetric surface.

$$Z = \Sigma_n \Sigma_m C_{nm} X^n Y^{n-m}$$

where $\Sigma_n$ indicates that n of $\Sigma$ is from 0 to k, and $\Sigma_M$ indicates that m of $\Sigma$ is from 0 to n.

In a case where a plane-symmetry three-dimensional surface (i.e. a rotationally asymmetric surface having only one plane of symmetry) is defined by the equation expressing a rotationally asymmetric surface, when symmetry produced by the plane of symmetry is to be obtained in the direction X, all terms with odd-numbered powers of X are made zero (for example, the coefficients of the terms with odd-numbered powers of X are set equal to zero). To obtain symmetry produced by the plane of symmetry in the direction Y, all terms with odd-numbered powers of Y are made zero (for example, the coefficients of the terms with odd-numbered powers of Y are set equal to zero).

Assuming that k=7 (polynomial of degree 7), for example, a plane-symmetry three-dimensional surface which is symmetric with respect to the direction X is expressed by an expanded form of the above equation as follows:

$$Z = C_2 + C_3Y + C_4X + C_5Y^2 + C_6YX + C_7X^2 + \quad (b)$$
$$C_8Y^3 + C_9Y^2X + C_{10}YX^2 + C_{11}X^3 +$$
$$C_{12}Y^4 + C_{13}Y^3X + C_{14}Y^2X^2 + C_{15}YX^3 + C_{16}X^4 +$$
$$C_{17}Y^5 + C_{18}Y^4X + C_{19}Y^3X^2 + C_{20}Y^2X^3 + C_{21}YX^4 +$$
$$C_{22}X^5 +$$
$$C_{23}Y^6 + C_{24}Y^5X + C_{25}Y^4X^2 + C_{26}Y^3X^3 + C_{27}Y^2X^4 +$$
$$C_{28}YX^5 + C_{29}X^6 +$$
$$C_{30}Y^7 + C_{31}Y^6X + C_{32}Y^5X^2 + C_{33}Y^4X^3 + C_{34}Y^3X^4 +$$
$$C_{35}Y^2X^5 + C_{36}YX^6 + C_{37}X^7$$

In the above defining Eq.(b), the coefficients $C_4$, $C_6$, $C_9$, . . . of the terms with odd-numbered powers of X are set equal to zero (see Examples described later). It should be noted that coefficients concerning aspherical surfaces which are not shown in the constituent parameters (shown later) are zero.

Plane-symmetry three-dimensional surfaces may also be defined by Zernike polynomials. That is, the configuration of a plane-symmetry three-dimensional surface may be defined by the following Eq.(c). The Z-axis of the defining Eq.(c) is the axis of Zernike polynomial.

$$X = R \times \cos(A)$$
$$Y = R \times \sin(A)$$
$$\begin{aligned}Z = &\ D_2 + D_3 R \cos(A) + D_4 R \sin(A) + \\ &\ D_5 R^2 \cos(2A) + D_6(R^2 - 1) + D_7 R^2 \sin(2A) + \\ &\ D_8 R^3 \cos(3A) + D_9(3R^3 - 2R)\cos(A) + \\ &\ D_{10}(3R^3 - 2R)\sin(A) + D_{11} R^3 \sin(3A) + \\ &\ D_{12} R^4 \cos(4A) + D_{13}(4R^4 - 3R^2)\cos(2A) + \\ &\ D_{14}(6R^4 - 6R^2 + 1) + D_{15}(4R^4 - 3R^2)\sin(2A) + \\ &\ D_{16} R^4 \sin(4A) + D_{17} R^5 \cos(5A) + \\ &\ D_{18}(5R^5 - 4R^3)\cos(3A) + \\ &\ D_{19}(10R^5 - 12R^3 + 3R)\cos(A) + \\ &\ D_{20}(10R^5 - 12R^3 + 3R)\sin(A) + \\ &\ D_{21}(5R^5 - 4R^3)\sin(3A) + D_{22} R^5 \sin(5A) + \\ &\ D_{23} R^6 \cos(6A) + D_{24}(6R^6 - 5R^4)\cos(4A) + \\ &\ D_{25}(15R^6 - 20R^4 + 6R^2)\cos(2A) + \\ &\ D_{26}(20R^6 - 30R^4 + 12R^2 - 1) + \\ &\ D_{27}(15R^6 - 20R^4 + 6R^2)\sin(2A) + \\ &\ D_{28}(6R^6 - 5R^4)\sin(4A) + D_{29} R^6 \sin(6A) \ldots \end{aligned} \quad (c)$$

It should be noted that the plane-symmetry three-dimensional surface in the above equation is expressed as a surface which is symmetric with respect to the direction X. In the above equation, $D_m$ (m is an integer of 2 or higher) are coefficients.

As an example of other expressions of surfaces usable in the present invention, the above defining equation ($Z = \Sigma_n \Sigma_m C_{nm} X^n Y^{n-m}$) may be expanded to express a surface which is symmetric with respect to the direction X and in which k=7, as shown by the following Eq.(d) as in the case of Eq.(b):

$$\begin{aligned}Z = &\ C_2 + C_3 Y + C_4|X| + C_5 Y^2 + C_6 Y|X| + C_7 X^2 + \\ &\ C_8 Y^3 + C_9 Y^2 |X| + C_{10} Y X^2 + C_{11}|X^3| + \\ &\ C_{12} Y^4 + C_{13} Y^3 |X| + C_{14} Y^2 X^2 + C_{15} Y|X^3| + C_{16} X^4 + \\ &\ C_{17} Y^5 + C_{18} Y^4 |X| + C_{19} Y^3 X^2 + C_{20} Y^2 |X^3| + \end{aligned} \quad (d)$$

-continued
$$\begin{aligned}&\ C_{21} Y X^4 + C_{22}|X^5| + \\ &\ C_{23} Y^6 + C_{24} Y^5 |X| + C_{25} Y^4 X^2 + C_{26} Y^3 |X^3| + \\ &\ C_{27} Y^2 X^4 + C_{28} Y|X^5| + C_{29} X^6 + \\ &\ C_{30} Y^7 + C_{31} Y^6 |X| + C_{32} Y^5 X^2 + C_{33} Y^4 |X^3| + \\ &\ C_{34} Y^3 X^4 + C_{35} Y^2 |X^5| + C_{36} Y X^6 + C_{37}|X^7|\end{aligned}$$

The configuration of a rotationally symmetric aspherical surface is defined by the following equation. The Z-axis of the defining equation is the axis of the rotationally symmetric aspherical surface.

$$Z = (Y^2/R) / \left[ 1 + \{1 - P(Y^2/R^2)\}^{1/2} \right] + A_4 Y^4 + A_6 Y^6 + A_8 Y^8 + A_{10} Y^{10} \ldots \quad (e)$$

where Y is a direction perpendicular to Z; R is a paraxial curvature radius; P is a conical coefficient; and $A_4$, $A_6$, $A_8$, and $A_{10}$ are aspherical coefficients, respectively.

In the constituent parameters (shown later), those terms concerning aspherical surfaces for which no data is shown are zero. The refractive index is expressed by the refractive index for the spectral d-line (wavelength: 587.56 nanometers). Lengths are given in millimeters.

FIGS. 3 to 6 are sectional views of Examples 1 to 4, taken along the YZ-plane containing the optical axis 2 of the decentered prism optical system 7. The decentered prism optical system 7 according to any of Examples 1 to 4 has three surfaces 3, 4 and 5 as in the case of FIG. 1. The space between the three surfaces 3 to 5 is filled with a transparent medium having a refractive index larger than 1.3. A bundle of light rays from an object (not shown) first passes through the pupil 1 of the optical system 7 along the optical axis 2 and enters the optical system 7 through the first surface 3, which has both transmitting and reflecting actions. The incident light rays are reflected toward the pupil 1 by the second surface 4, which is disposed at a side of the optical system 7 remote from the pupil 1 and has only a reflecting action. The reflected rays are reflected by the first surface 3 so as to travel away from the pupil 1. The reflected rays pass through the third surface 5, which has only a transmitting action, and reach the image plane 6 where the rays form an image. In Examples 1 to 3, the first surface 3 is a decentered spherical surface having a concave surface directed toward the pupil 1. In Example 4, the first surface 3 is a rotationally symmetric aspherical surface defined by the above equation (e), which is decentered and has a concave surface directed toward the pupil 1. In all of Examples 1 to 4, the second surface 4 and the third surface 5 are each formed from a three-dimensional surface defined by the above equation (b). In each of Examples 1 to 4, the horizontal field angle is 37°, the vertical field angle is 27.6°, and the pupil diameter is 4 millimeters.

Constituent parameters in Examples 1 to 4 are as follows:

|  | Example 1 | | | | |
| --- | --- | --- | --- | --- | --- |
| Surface No. | Radius of curvature | Surface separation | Displacement and tilt | Refractive index | Abbe's No. |
| Object plane | ∞ | ∞ | | | |
| 1 |  | ∞(Pupil) | | | |

-continued

| | | | | | |
|---|---|---|---|---|---|
| 2 | −167.559 | | (1) | 1.4922 | 57.5 |
| 3 | Three-dimensional surface(1) | | (2) | 1.4922 | 57.5 |
| 4 | −167.559 | | (1) | 1.4922 | 57.5 |
| 5 | Three-dimensional surface(2) | | (3) | | |
| Image plane | ∞ | | (4) | | |

Three-dimensional surface(1)

| | | | | | |
|---|---|---|---|---|---|
| $C_5$ | −8.2644 × 10$^{-3}$ | $C_7$ | −8.9985 × 10$^{-3}$ | $C_8$ | 3.7852 × 10$^{-5}$ |
| $C_{10}$ | 1.3727 × 10$^{-5}$ | $C_{12}$ | 3.4753 × 10$^{-8}$ | $C_{14}$ | −3.2511 × 10$^{-6}$ |
| $C_{16}$ | −7.6369 × 10$^{-7}$ | $C_{17}$ | 1.5767 × 10$^{-7}$ | $C_{19}$ | −6.2172 × 10$^{-8}$ |
| $C_{21}$ | 2.9399 × 10$^{-8}$ | $C_{23}$ | 5.8293 × 10$^{-9}$ | $C_{25}$ | 4.0550 × 10$^{-9}$ |
| $C_{27}$ | 1.7532 × 10$^{-9}$ | $C_{29}$ | −9.2932 × 10$^{-10}$ | $C_{30}$ | 7.9948 × 10$^{-11}$ |
| $C_{32}$ | 4.2710 × 10$^{-10}$ | $C_{34}$ | 2.2002 × 10$^{-10}$ | $C_{36}$ | −1.1987 × 10$^{-10}$ |

Three-dimensional surface(2)

| | | | | | |
|---|---|---|---|---|---|
| $C_5$ | −2.4569 × 10$^{-2}$ | $C_7$ | −9.2271 × 10$^{-3}$ | $C_8$ | 1.8803 × 10$^{-3}$ |
| $C_{10}$ | 9.0656 × 10$^{-4}$ | $C_{12}$ | 5.3303 × 10$^{-5}$ | $C_{14}$ | 1.8144 × 10$^{-1}$ |
| $C_{16}$ | 8.6739 × 10$^{-6}$ | $C_{17}$ | −1.1351 × 10$^{-5}$ | $C_{19}$ | −1.6466 × 10$^{-5}$ |
| $C_{21}$ | −9.3221 × 10$^{-7}$ | | | | |

Displacement and tilt

| | X | Y | Z | α(°) | β(°) | γ(°) |
|---|---|---|---|---|---|---|
| (1) | 0.000 | 7.108 | 25.777 | 19.22 | 0.00 | 0.00 |
| (2) | 0.000 | 4.756 | 37.554 | −8.06 | 0.00 | 0.00 |
| (3) | 0.000 | 19.525 | 30.305 | 86.90 | 0.00 | 0.00 |
| (4) | 0.000 | 23.309 | 33.150 | 61.64 | 0.00 | 0.00 |

Example 2

| Surface No. | Radius of curvature | Surface separation | Displacement and tilt | Refractive index | Abbe's No. |
|---|---|---|---|---|---|
| Object plane | ∞ | ∞ | | | |
| 1 | ∞(Pupil) | | | | |
| 2 | −109.365 | | (1) | 1.4922 | 57.5 |
| 3 | Three-dimensional surface(1) | | (2) | 1.4922 | 57.5 |
| 4 | −109.365 | | (1) | 1.4922 | 57.5 |
| 5 | Three-dimensional surface(2) | | (3) | | |
| Image plane | ∞ | | (4) | | |

Three-dimensional surface(1)

| | | | | | |
|---|---|---|---|---|---|
| $C_5$ | −1.0133 × 10$^{-2}$ | $C_7$ | −1.0025 × 10$^{-2}$ | $C_8$ | 5.6608 × 10$^{-5}$ |
| $C_{10}$ | 2.5415 × 10$^{-5}$ | $C_{12}$ | −2.1481 × 10$^{-6}$ | $C_{14}$ | −3.4315 × 10$^{-6}$ |
| $C_{16}$ | −1.3836 × 10$^{-6}$ | $C_{17}$ | −4.1483 × 10$^{-6}$ | $C_{19}$ | 6.6703 × 10$^{-8}$ |
| $C_{21}$ | 3.5615 × 10$^{-6}$ | $C_{23}$ | 8.7397 × 10$^{-9}$ | $C_{25}$ | −1.2505 × 10$^{-8}$ |
| $C_{27}$ | −4.5501 × 10$^{-10}$ | $C_{29}$ | 2.6484 × 10$^{-10}$ | $C_{30}$ | −1.9631 × 10$^{-10}$ |
| $C_{32}$ | 4.6259 × 10$^{-10}$ | $C_{34}$ | −4.9439 × 10$^{-12}$ | $C_{36}$ | −1.1870 × 10$^{-10}$ |

Three-dimensional surface(2)

| | | | | | |
|---|---|---|---|---|---|
| $C_5$ | −1.6101 × 10$^{-2}$ | $C_7$ | 8.9510 × 10$^{-3}$ | $C_8$ | −2.3326 × 10$^{-3}$ |
| $C_{10}$ | −7.6454 × 10$^{-5}$ | $C_{12}$ | −1.8499 × 10$^{-4}$ | $C_{14}$ | −5.5035 × 10$^{-4}$ |
| $C_{16}$ | 2.0491 × 10$^{-5}$ | $C_{19}$ | −3.6151 × 10$^{-5}$ | $C_{21}$ | 1.5782 × 10$^{-6}$ |

Displacement and tilt

| | X | Y | Z | α(°) | β(°) | γ(°) |
|---|---|---|---|---|---|---|
| (1) | 0.000 | 7.977 | 25.617 | 14.61 | 0.00 | 0.00 |
| (2) | 0.000 | −2.742 | 35.528 | −19.28 | 0.00 | 0.00 |
| (3) | 0.000 | 19.605 | 22.719 | 93.54 | 0.00 | 0.00 |
| (4) | 0.000 | 22.522 | 33.564 | 58.60 | 0.00 | 0.00 |

Example 3

| Surface No. | Radius of curvature | Surface separation | Displacement and tilt | Refractive index | Abbe's No. |
|---|---|---|---|---|---|
| Object plane | ∞ | ∞ | | | |
| 1 | ∞(Pupil) | | | | |
| 2 | −131.243 | | (1) | 1.4922 | 57.5 |
| 3 | Three-dimensional surface(1) | | (2) | 1.4922 | 57.5 |
| 4 | −131.243 | | (1) | 1.4922 | 57.5 |
| 5 | Three-dimensional surface(2) | | (3) | | |

-continued

| Image plane | $\infty$ | | | (4) |
|---|---|---|---|---|

Three-dimensional surface(1)

| $C_5$ | $-8.9284 \times 10^{-3}$ | $C_7$ | $-9.2053 \times 10^{-3}$ | $C_8$ | $3.8229 \times 10^{-5}$ |
|---|---|---|---|---|---|
| $C_{10}$ | $4.2262 \times 10^{-5}$ | $C_{12}$ | $-7.2223 \times 10^{-7}$ | $C_{14}$ | $-1.3031 \times 10^{-6}$ |
| $C_{16}$ | $-1.9520 \times 10^{-6}$ | $C_{17}$ | $1.1271 \times 10^{-7}$ | $C_{19}$ | $-3.6870 \times 10^{-8}$ |
| $C_{21}$ | $-1.1768 \times 10^{-7}$ | $C_{23}$ | $1.6276 \times 10^{-9}$ | $C_{25}$ | $-6.7166 \times 10^{-9}$ |
| $C_{27}$ | $-7.7763 \times 10^{-9}$ | $C_{29}$ | $3.4606 \times 10^{-9}$ | $C_{30}$ | $-2.4515 \times 10^{-10}$ |
| $C_{32}$ | $2.9077 \times 10^{-10}$ | $C_{34}$ | $-1.8189 \times 10^{-10}$ | $C_{36}$ | $-1.8698 \times 10^{-10}$ |

Three-dimensional surface(2)

| $C_5$ | $-4.9779 \times 10^{-3}$ | $C_7$ | $-1.7671 \times 10^{-2}$ | $C_8$ | $-7.3015 \times 10^{-4}$ |
|---|---|---|---|---|---|
| $C_{10}$ | $2.7601 \times 10^{-3}$ | $C_{12}$ | $-1.6689 \times 10^{-4}$ | $C_{14}$ | $-3.4904 \times 10^{-4}$ |
| $C_{16}$ | $2.3877 \times 10^{-4}$ | $C_{19}$ | $-2.6265 \times 10^{-5}$ | $C_{21}$ | $-1.7550 \times 10^{-5}$ |
| $C_{25}$ | $-4.7065 \times 10^{-7}$ | $C_{27}$ | $3.7320 \times 10^{-6}$ | $C_{29}$ | $-1.1090 \times 10^{-6}$ |
| $C_{32}$ | $-1.0260 \times 10^{-7}$ | $C_{34}$ | $2.4355 \times 10^{-7}$ | $C_{36}$ | $1.6830 \times 10^{-7}$ |

Displacement and tilt

| | X | Y | Z | $\alpha(°)$ | $\beta(°)$ | $\gamma(°)$ |
|---|---|---|---|---|---|---|
| (1) | 0.000 | 8.065 | 25.582 | 15.00 | 0.00 | 0.00 |
| (2) | 0.000 | 1.394 | 37.156 | -13.88 | 0.00 | 0.00 |
| (3) | 0.000 | 20.169 | 24.811 | 92.24 | 0.00 | 0.00 |
| (4) | 0.000 | 23.024 | 33.868 | 57.68 | 0.00 | 0.00 |

Example 4

| Surface No. | Radius of curvature | Surface separation | Displacement and tilt | Refractive index | Abbe's No. |
|---|---|---|---|---|---|
| Object plane | $\infty$ | $\infty$ | | | |
| 1 | | $\infty$(Pupil) | | | |
| 2 | -121.590 (Aspheric) | | 偏心(1) | 1.4922 | 57.5 |
| 3 | Three-dimensional surface(1) | | 偏心(2) | 1.4922 | 57.5 |
| 4 | -121.590 (Aspheric) | | 偏心(1) | 1.4922 | 57.5 |
| 5 | Three-dimensional surface(2) | | 偏心(3) | | |
| Image plane | $\infty$ | | 偏心(4) | | |

Aspherical Coefficients

Surface No.: 2, 4
P = 1
$A_4 = -0.47078 \times 10^{-5}$
$A_6 = 0.91622 \times 10^{-8}$
$A_8 = 0.14049 \times 10^{-10}$
$A_{10} = -0.31035 \times 10^{-13}$ Three-dimensional surface(1)

| $C_5$ | $-9.8116 \times 10^{-3}$ | $C_7$ | $-9.9228 \times 10^{-3}$ | $C_8$ | $3.0681 \times 10^{-5}$ |
|---|---|---|---|---|---|
| $C_{10}$ | $4.5462 \times 10^{-5}$ | $C_{12}$ | $-3.8345 \times 10^{-6}$ | $C_{14}$ | $-4.1008 \times 10^{-6}$ |
| $C_{16}$ | $-4.6317 \times 10^{-6}$ | $C_{17}$ | $2.1625 \times 10^{-7}$ | $C_{19}$ | $1.6597 \times 10^{-7}$ |
| $C_{21}$ | $-1.6454 \times 10^{-7}$ | $C_{23}$ | $1.0751 \times 10^{-8}$ | $C_{25}$ | $4.0250 \times 10^{-9}$ |
| $C_{27}$ | $3.4501 \times 10^{-9}$ | $C_{29}$ | $8.6519 \times 10^{-9}$ | $C_{30}$ | $-5.3805 \times 10^{-10}$ |
| $C_{32}$ | $-1.0139 \times 10^{-9}$ | $C_{34}$ | $-5.5962 \times 10^{-10}$ | $C_{36}$ | $2.7231 \times 10^{-10}$ |

Three-dimensional surface(2)

| $C_5$ | $-4.7478 \times 10^{-2}$ | $C_7$ | $-1.8423 \times 10^{-2}$ | $C_8$ | $-5.2664 \times 10^{-3}$ |
|---|---|---|---|---|---|
| $C_{10}$ | $5.1605 \times 10^{-4}$ | $C_{12}$ | $-2.4447 \times 10^{-4}$ | $C_{14}$ | $-5.4622 \times 10^{-4}$ |
| $C_{16}$ | $4.7482 \times 10^{-4}$ | $C_{19}$ | $-1.2350 \times 10^{-4}$ | $C_{21}$ | $-2.0224 \times 10^{-5}$ |
| $C_{25}$ | $-1.1895 \times 10^{-5}$ | $C_{27}$ | $3.5172 \times 10^{-7}$ | $C_{29}$ | $-2.4403 \times 10^{-6}$ |
| $C_{32}$ | $-3.8988 \times 10^{-7}$ | $C_{34}$ | $-1.1605 \times 10^{-8}$ | $C_{36}$ | $2.3716 \times 10^{-7}$ |

Displacement and tilt

| | X | Y | Z | $\alpha(°)$ | $\beta(°)$ | $\gamma(°)$ |
|---|---|---|---|---|---|---|
| (1) | 0.000 | 7.771 | 25.658 | 15.00 | 0.00 | 0.00 |
| (2) | 0.000 | 1.049 | 36.261 | -14.93 | 0.00 | 0.00 |
| (3) | 0.000 | 19.049 | 21.405 | 98.38 | 0.00 | 0.00 |
| (4) | 0.000 | 22.022 | 33.091 | 59.19 | 0.00 | 0.00 |

Figure 11:
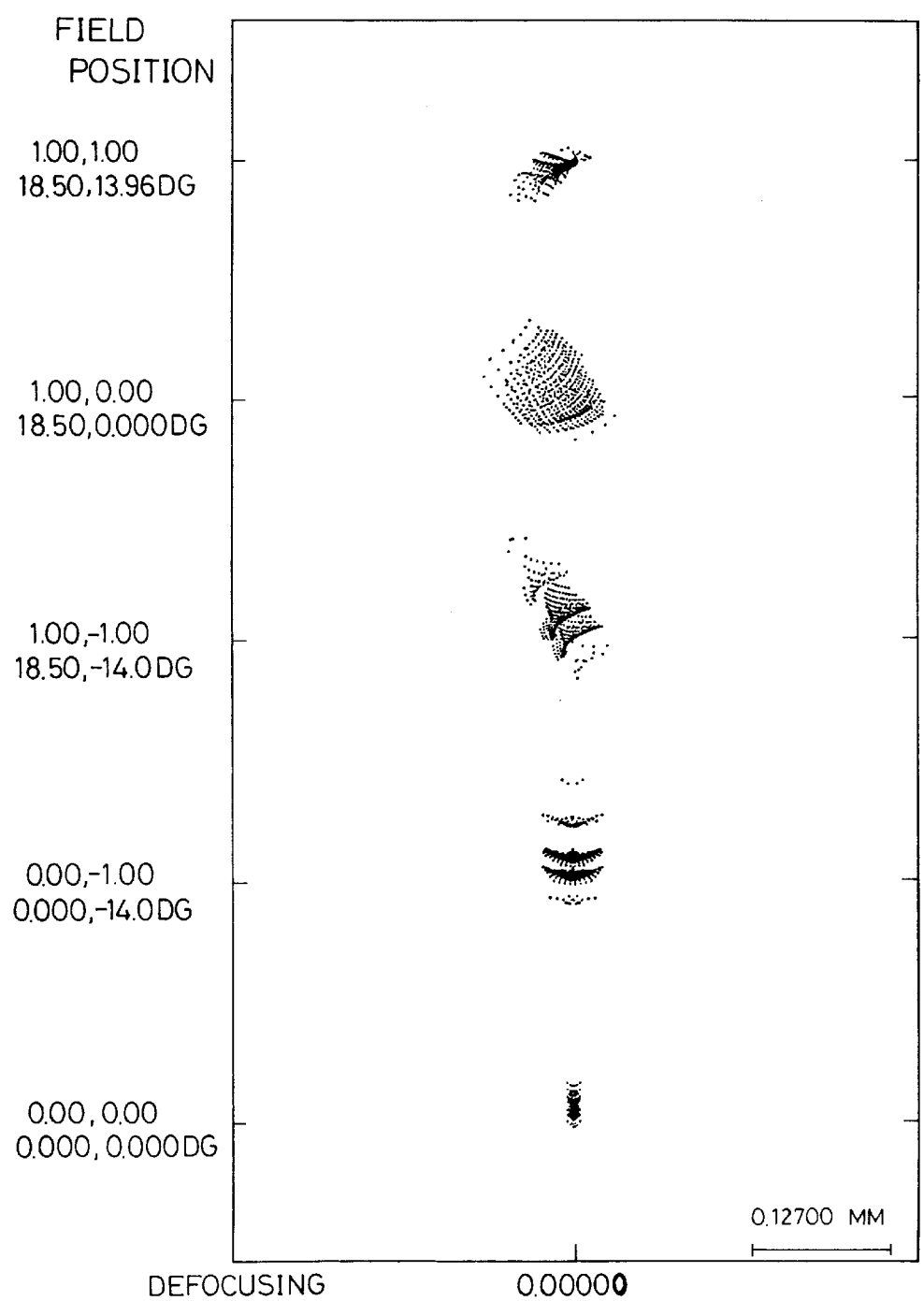
FIG. 11 is a part of a spot diagram showing the condition of aberration correction in Example 1.
Figure 12:
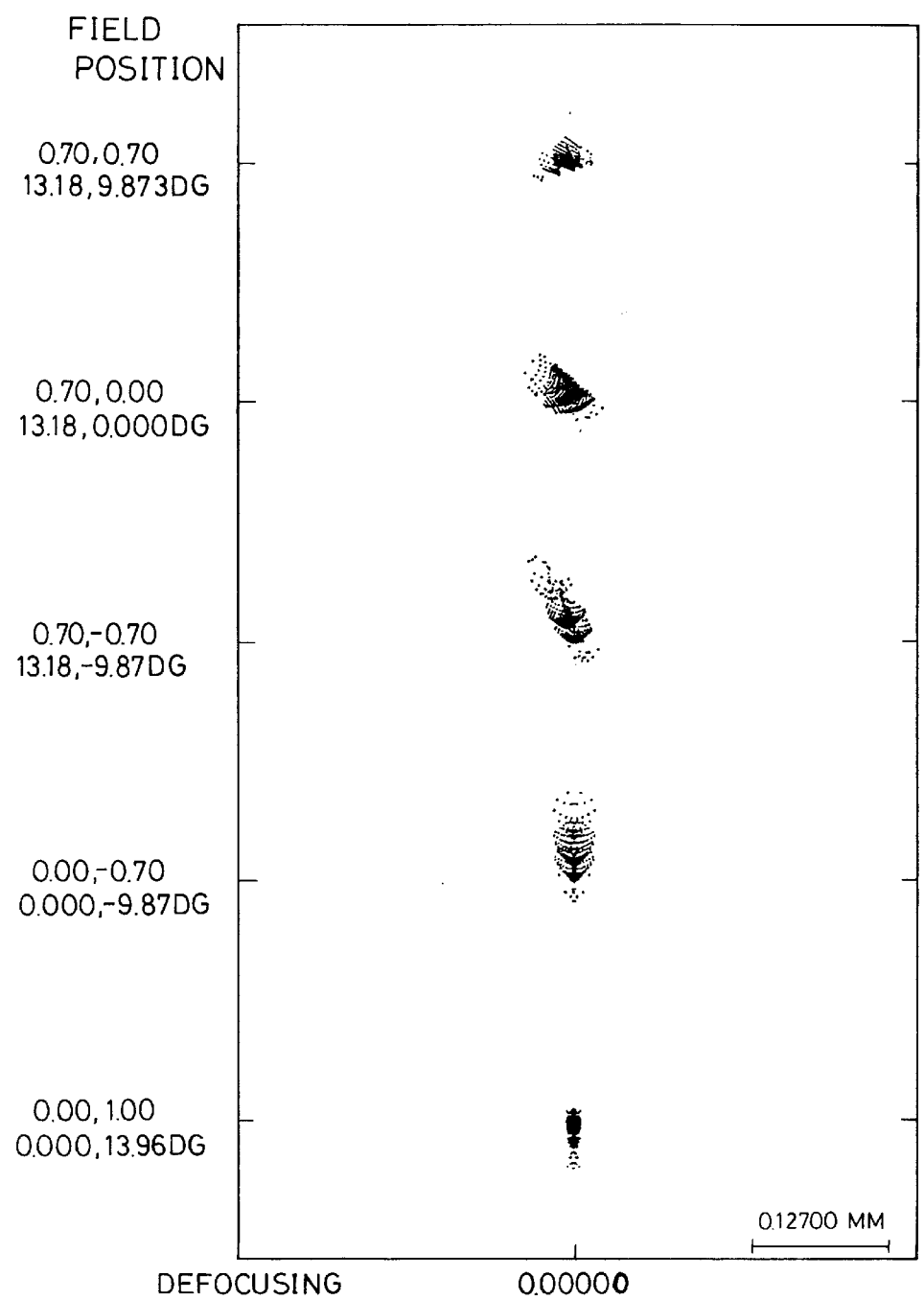
FIG. 12 is another part of the spot diagram showing the condition of aberration correction in Example 1.
Figure 13:
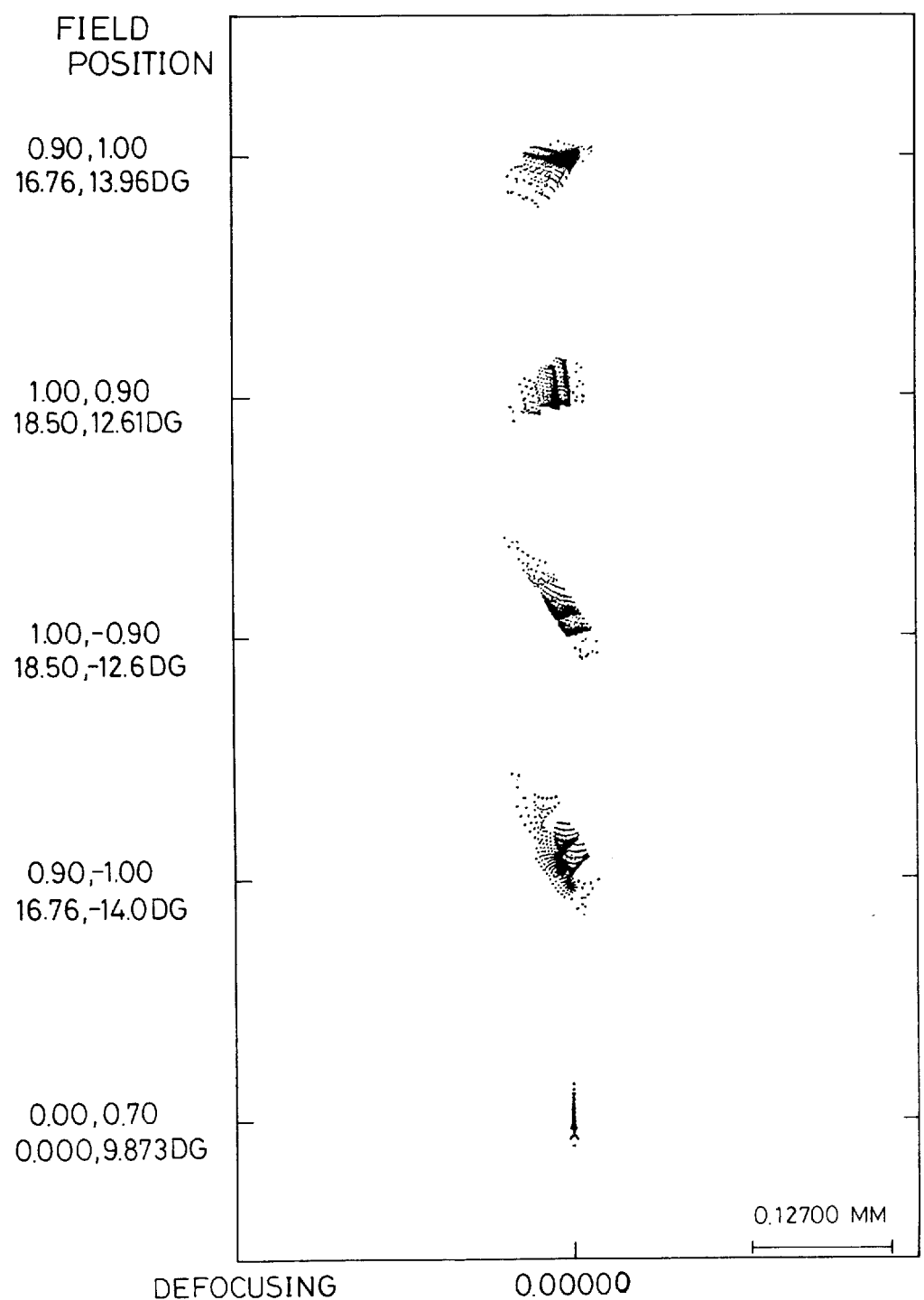
FIG. 13 is the other part of the spot diagram showing the condition of aberration correction in Example 1.

FIGS. 7 to 10 are aberrational diagrams showing image distortion in Examples 1 to 4, respectively. In these aberrational diagrams, the ordinate axis represents the image height in the direction X, and the abscissa axis represents the image height in the direction Y. FIGS. 11 to 13 are spot diagrams showing the condition of aberration correction in Example 1. In these figures, in each group of four numerals on the left-hand side of each spot diagram, the upper two numerals represent coordinates (X, Y) when the coordinates (X, Y) of a rectangular image field are expressed as follows: The coordinates of the center of the image field are (0.00, 0.00); the coordinates of the center of the right-hand edge thereof are (0.00, −1.00); the coordinates of the top right corner thereof are (1.00, −1.00); and the coordinates of the center of the top edge thereof are (1.00, 0.00). The lower two numerals represent X- and Y-components (expressed by degrees) of angle (field angle) formed by the coordinate axes (X, Y) with respect to the optical axis (the center of the image field).

The values of the parameters concerning the above conditions (0-1) to (J-1) in Examples 1 to 4 are as follows:

|        | Example 1 | Example 2 | Example 3 | Example 4 |
|--------|-----------|-----------|-----------|-----------|
| α      | 19.22°    | 14.61°    | 15.00°    | 15.00°    |
| FA     | 1.10379   | 1.08442   | 0.98299   | 0.82573   |
| \|PxB\| | 1.20795   | 1.32087   | 1.08914   | 1.01106   |
| \|PyC\| | 1.05216   | 1.17891   | 1.08173   | 1.21659   |
| CxyD   | 1.04011   | 1.03319   | 1.02427   | 1.00647   |
| CxMinE | 0.40002   | 0.44125   | 0.35154   | 0.32751   |
| CxMaxE | 0.42129   | 0.45951   | 0.38258   | 0.36617   |
| CyMinF | 0.29623   | 0.33639   | 0.30109   | 0.35772   |
| CyMaxF | 0.43506   | 0.47424   | 0.43253   | 0.48077   |
| CyG    | −0.12077  | −0.11486  | −0.11108  | −0.12305  |
| CxH    | −0.01613  | −0.00972  | −0.02821  | −0.03004  |
| CyI    | −0.15562  | −1.26294  | −1.36501  | −1.08043  |
| CxJ    | −0.10314  | −0.28649  | −0.29941  | −0.16724  |

Figure 14:
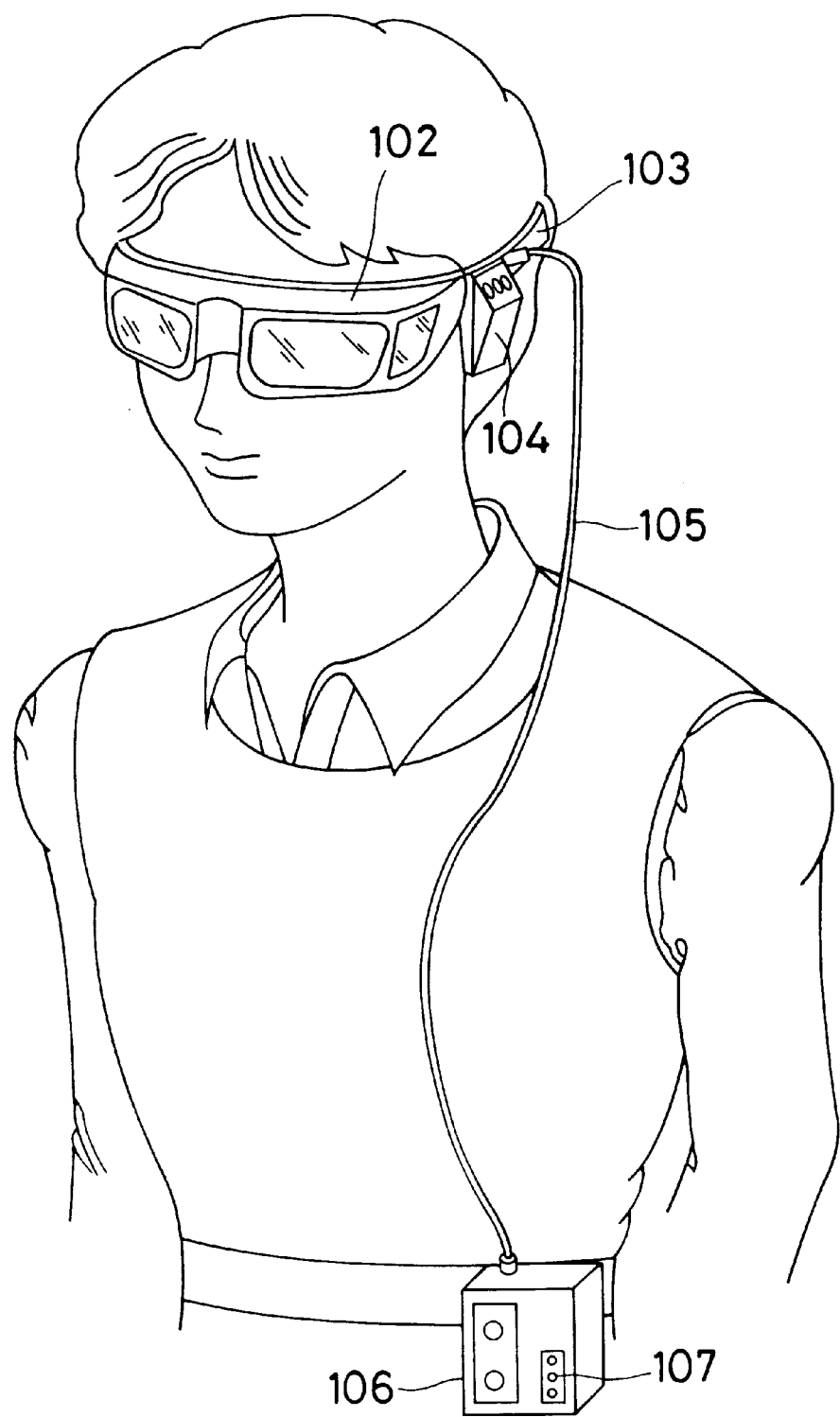
FIG. 14 shows a head-mounted image display apparatus using the decentered prism optical system according to the present invention, which is fitted on an observer's head.
Figure 15:
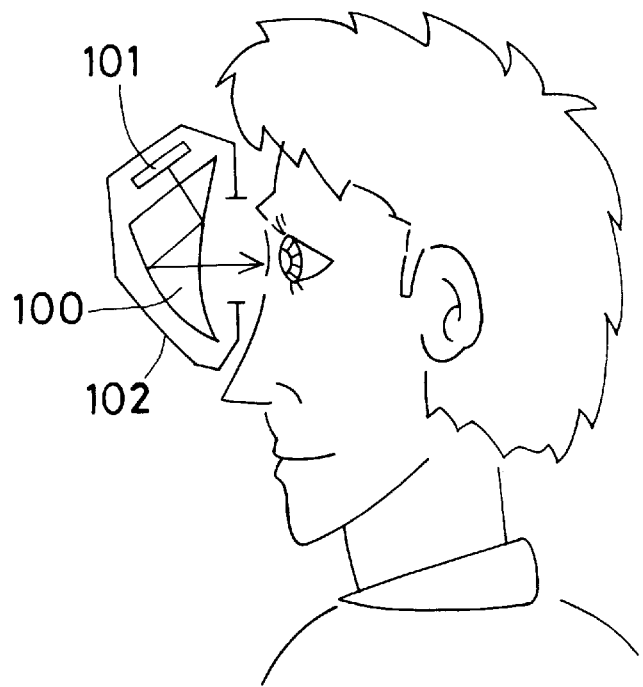
FIG. 15 is a sectional view showing a part of the head-mounted image display apparatus in FIG. 14 which lies in the vicinity of the observer's head.

The decentered prism optical system according to the present invention, arranged as described above, can be used in an image display apparatus. As one example thereof, FIG. 14 shows a head-mounted image display apparatus as fitted on an observer's head, and FIG. 15 shows a sectional view of the head-mounted image display apparatus. In the illustrated arrangement, as shown in FIG. 15, the decentered prism optical system according to the present invention is used as an ocular optical system 100. A pair of combinations of an ocular optical system 100 and an image display device 101 are prepared for the left and right eyes, and supported apart from each other by the interpupillary distance, i.e. the distance between the two eyes, thereby forming a stationary or portable image display apparatus 102, such as a head-mounted image display apparatus, which enables the observer to see with both eyes.

More specifically, the display apparatus body unit 102 is equipped with a pair of left and right ocular optical systems 100, which are arranged as described above, and image display devices 101, which are liquid-crystal display devices, are disposed in the respective image planes of the two ocular optical systems 100. As shown in FIG. 14, the display apparatus body unit 102 is provided with temporal frames 103 which are contiguous with the left and right ends thereof so that the display apparatus body unit 102 can be held in front of the observer's eyes.

Further, a speaker 104 is provided on each temporal frame 103 to enable the user to enjoy listening to stereophonic sound in addition to image observation. The display apparatus body unit 102 having the speakers 104 is connected with a reproducing unit 106, e.g. a portable video cassette unit, through an image and sound transmitting cord 105. Therefore, the user can enjoy not only observing an image but also listening to sound with the reproducing unit 106 retained on a desired position, e.g. a belt, as illustrated in FIG. 14. Reference numeral 107 in FIG. 14 denotes a switch and volume control part of the reproducing unit 106. It should be noted that the display apparatus body unit 102 contains electronic parts such as image and sound processing circuits.

The cord 105 may have a jack and plug arrangement attached to the distal end thereof so that the cord 105 can be detachably connected to an existing video deck. The cord 105 may also be connected to a TV signal receiving tuner so as to enable the user to enjoy watching TV. Alternatively, the cord 105 may be connected to a computer to receive computer graphic images or message images or the like from the computer. To eliminate the bothersome cord, the image display apparatus may be arranged to receive external radio signals through an antenna connected thereto.

Figure 16:
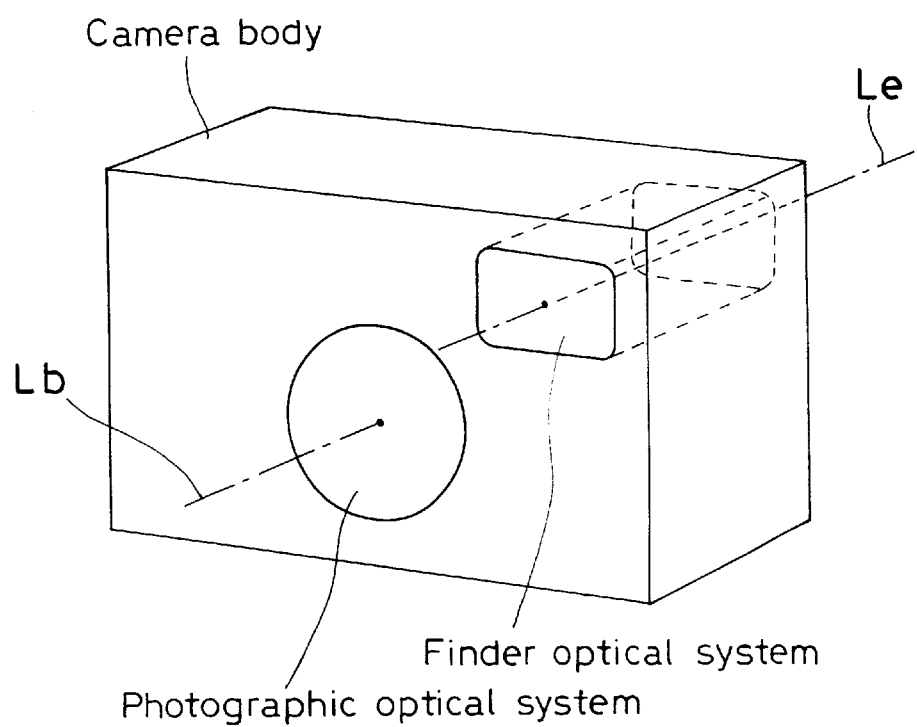
FIG. 16 is a perspective view showing the arrangement of a camera using the decentered prism optical system according to the present invention.
Figure 17:
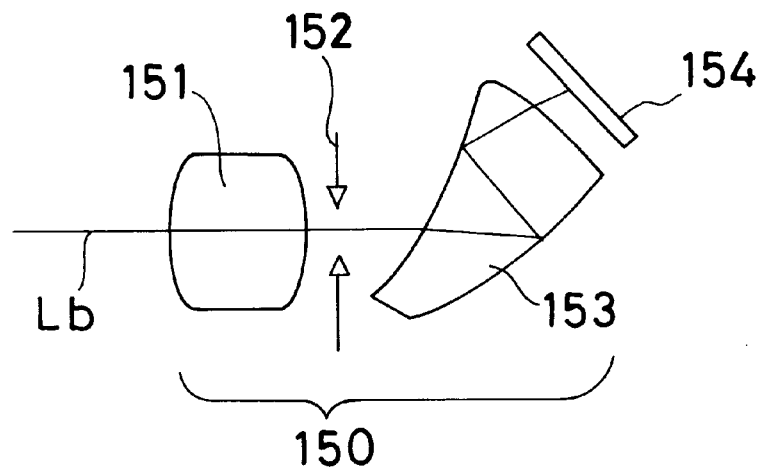
FIG. 17 is a ray path diagram of a photographic optical system using the decentered prism optical system according to the present invention.
Figure 18:
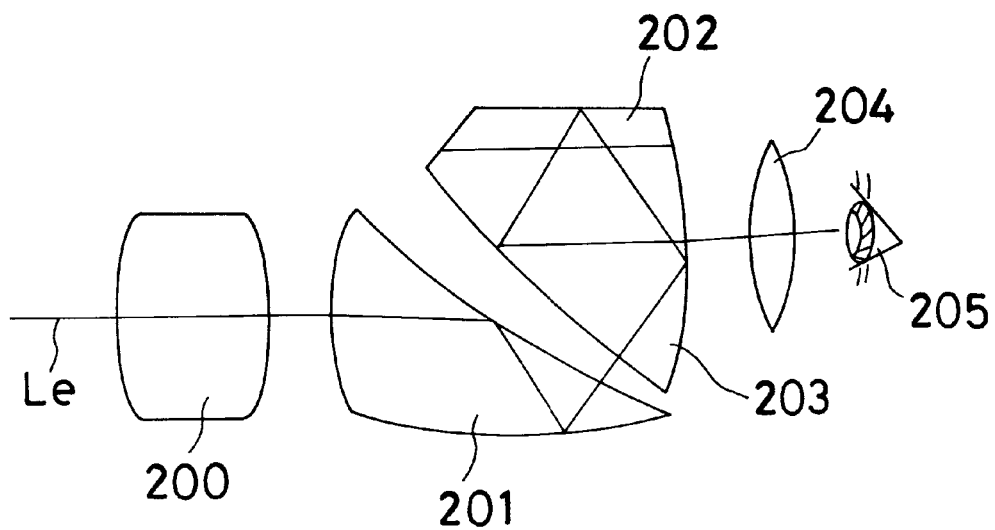
FIG. 18 is a ray path diagram of a finder optical system using the decentered prism optical system according to the present invention.

The decentered prism optical system according to the present invention can also be used in a photographic optical apparatus or an observation optical apparatus. As one example, the decentered prism optical system may be used in a camera having a photographic optical system and a finder optical system, as shown in FIG. 16. As shown in the ray path diagram of FIG. 17, an objective lens 150 has a front lens group 151 and a rear lens group 153, which are disposed to face each other across a pupil position (stop or hypothetic stop position) 152. The decentered prism optical system according to the present invention is disposed as the rear lens group 153 of the objective lens 150. By doing so, a film 154, which can be disposed only at right angles to the optical axis Lb in a conventional photographic optical system, can be disposed obliquely to the optical axis Lb. Accordingly, it is possible to increase the freedom of arrangement and hence possible to achieve a reduction in size and attain a compact camera. If an electronic light-receiving device, e.g. a CCD, is disposed in place of the film 154, the decentered prism optical system according to the present invention can also be applied to an electronic camera. Next, as shown in the ray path diagram of FIG. 18, a decentered prism optical system 201 and a roof prism 203 having a roof surface 202 are disposed as a device for erecting an image formed by an objective lens group 200 of a finder optical system, and the erect image is led to an observer's eyeball 205 through an ocular lens 204. By virtue of this arrangement, the height of the optical system can be made shorter than in the case of a conventional arrangement using a Porro prism. Thus, the size of the optical system can be reduced, and a compact structure can be obtained. It should be noted that reference character Le in FIG. 18 denotes an optical axis of the finder optical system.

Figure 19:
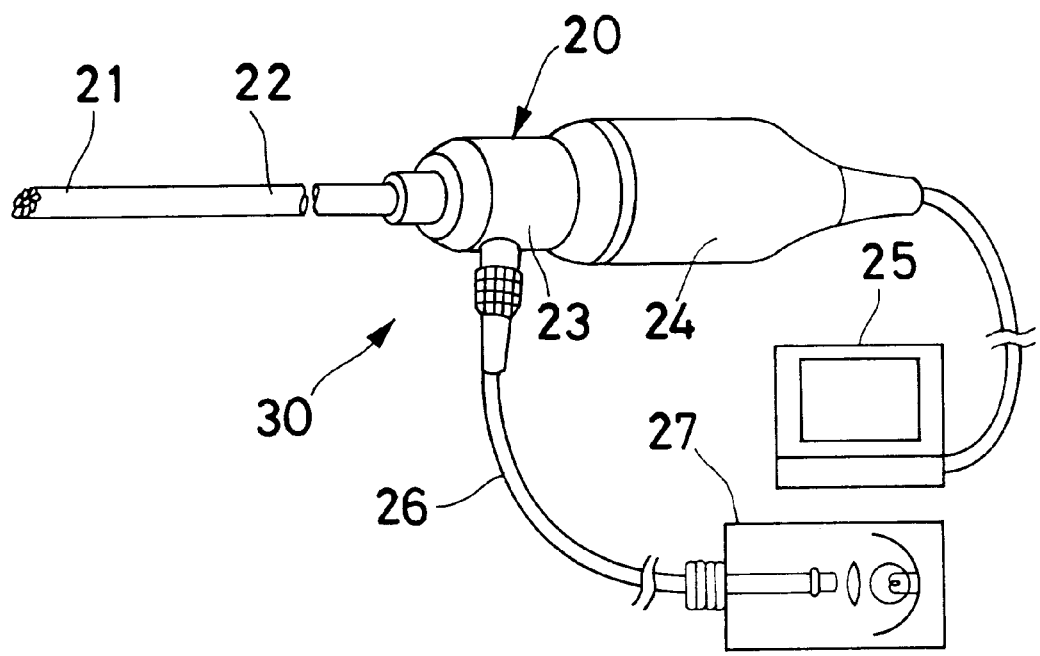
FIG. 19 shows the whole arrangement of an endoscope system.
Figure 20:
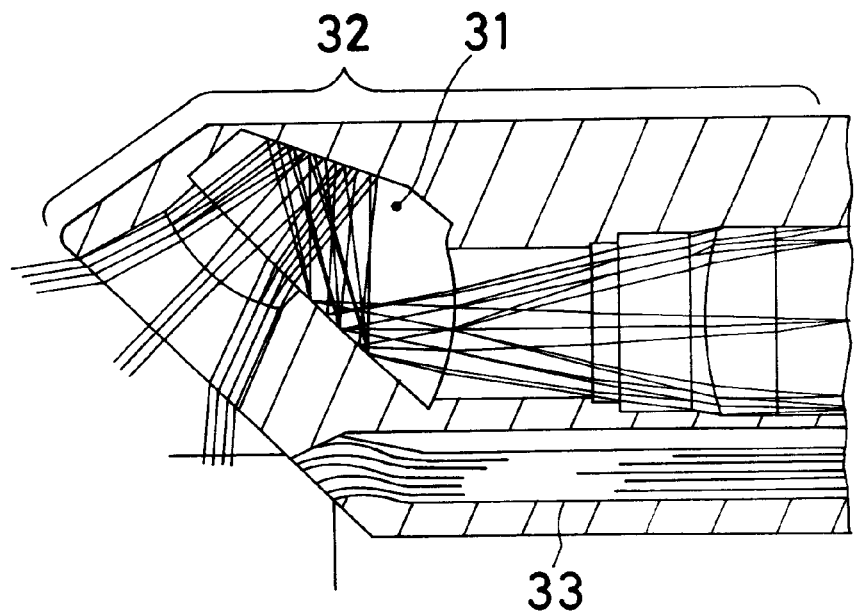
FIG. 20 is a sectional view of the distal end portion of a hard endoscope using the decentered prism optical system according to the present invention.

The decentered prism optical system according to the present invention can also be used in an objective lens of a hard endoscope in which an image is transferred to an ocular lens by using a relay lens. It is also possible to use the decentered prism optical system in an objective lens of a soft endoscope in which an image is transferred to an ocular lens by using an optical fiber bundle. Further, the decentered prism optical system can be used in an objective lens of a video endoscope in which light is received by a CCD to form an image. One example of such use applications is shown in FIGS. 19 and 20. FIG. 19 shows the whole arrangement of an endoscope system using a hard endoscope. The endoscope system 30 shown in FIG. 19 includes an endoscope 20 having an insert part 22 containing an objective lens and an illumination optical system. The endoscope system 30 further includes a camera 24, a monitor 25, and a light source unit 27. The endoscope 20 is arranged as follows: The insert part 22 has a distal end portion 21. As shown in FIG. 20, an objective lens 32 using a decentered prism optical system 31 according to the present invention, together with a light guide 33 for applying light in the direction of the visual field of the objective lens 32, is incorporated in the distal end portion 21 of the insert part 22. In the insert part 22, a relay lens system, which is an image and pupil transfer optical system, is provided subsequently to the objective lens 32. An ocular optical system (not shown) is disposed in a proximal portion 23 of the endoscope 20. The camera 24, which serves as an image pickup device, can be attached to the proximal portion 23 of the endoscope 20 at a position subsequent to the ocular optical system. The camera 24 is integrated with or detachably connected to the proximal portion 23 of the endoscope 20. A subject image taken by the camera 24 is eventually displayed on the monitor 25 so that it can be viewed as an endoscope image by an observer. Illuminating light from the light source unit 27 is supplied through a light guide cable 26 and passed successively through the proximal portion 23, the insert part 22, and the distal end portion 21 to illuminate an area in the direction of the visual field.

As will be clear from the foregoing description, the present invention makes it possible to provide a decentered prism optical system which can be used as an imaging optical system or ocular optical system capable of obtaining a clear image having minimal distortion even at a wide field angle, and in which a surface having a wide effective area is formed from a rotationally symmetric spherical, thereby enabling an evaluation to be readily performed at the time the optical system is produced.

What we claim is:

1. A decentered prism optical system comprising at least three surfaces which are decentered with respect to each other, wherein a space between said at least three surfaces is filled with a transparent medium having a refractive index not smaller than 1.3, wherein at least two of said at least three surfaces are reflecting surfaces arranged so that at least two internal reflections take place in said optical system, and wherein said at least two reflecting surfaces are disposed such that light rays reflected by these surfaces do not intersect each other in said optical system, and wherein one of said at least two reflecting surfaces is a rotationally asymmetric surface having no axis of rotational symmetry and only one plane of symmetry, and at least one other of said reflecting surfaces is arranged such that at least an effective surface thereof having an area that transmits and/or reflects a bundle of light rays in an entire area of the effective surface is formed from a rotationally symmetric surface having an axis of rotational symmetry intercepting the effective surface.

2. A decentered prism optical system according to claim 1, wherein said at least three surfaces include at least a first surface, a second surface, and a third surface, wherein said first surface has both a transmitting action through which a bundle of light rays enters said optical system or exits therefrom after passing through said first surface, and a reflecting action by which said bundle of light rays is bent in said optical system, said first surface being said rotationally symmetric surface, and wherein said second surface is disposed to face said first surface, said second surface being said rotationally asymmetric surface, and wherein said third surface has a transmitting action through which said bundle of light rays exits from said optical system after passing through said third surface or enters said third surface, said third surface being disposed to face in a direction approximately perpendicular to a direction in which said first surface and said second surface face each other.

3. A decentered prism optical system according to claim 2, wherein said first surface is arranged such that a transmitting region and a reflecting region overlap each other in at least a region of said effective surface thereof, and that at least said reflecting action taking place in the region of the effective surface of said first surface where the transmitting and reflecting regions overlap each other is total reflection.

4. A decentered prism optical system comprising at least three surfaces which are decentered with respect to each other, wherein a space between said at least three surfaces is filled with a transparent medium having a refractive index not smaller than 1.3, wherein at least two of said at least three surfaces are reflecting surfaces arranged so that at least two internal reflections take place in said optical system, and wherein said at least two reflecting surfaces are disposed such that light rays reflected by these surfaces do not intersect each other in said optical system, and wherein one of said at least two reflecting surfaces is a rotationally asymmetric surface having no axis of rotational symmetry, and at least one other of said reflecting surfaces is arranged such that at least an effective surface thereof having an area that transmits and/or reflects a bundle of light rays in an entire area of the effective surface is formed from a rotationally symmetric surface having an axis of rotational symmetry in the effective surface, wherein said at least three surfaces include at least a first surface, a second surface, and a third surface, wherein said first surface has both a transmitting action through which a bundle of light rays enters said optical system or exits therefrom after passing through said first surface, and a reflecting action by which said bundle of light rays is bent in said optical system, said first surface being said rotationally symmetric surface, and wherein said second surface is disposed to face said first surface, said second surface being said rotationally asymmetric surface, and wherein said third surface has a transmitting action through which said bundle of light rays exits from said optical system after passing through said third surface or enters said third surface, said third surface being disposed to face in a direction approximately perpendicular to a direction in which said first surface and said second surface face each other wherein said first surface is arranged such that at least an effective surface having an area that transmits and/or reflects a bundle of light rays in an entire area of the surface of said first surface is formed from a rotationally symmetric aspherical surface having an axis of rotational symmetry in the effective surface, and the following condition is satisfied:

$$5° < \alpha < 30°$$

where $\alpha$ is a tilt angle of the surface of intersection between a rotation center axis of the rotationally symmetric aspherical surface constituting said first surface and a straight line along which an axial principal ray passes through a center of a pupil of said optical system until it intersects said first surface.

5. A decentered prism optical system according to claim 4, wherein said first surface is arranged such that a transmitting region and a reflecting region overlap each other in at least a region of said effective surface thereof, and that at least said reflecting action taking place in the region of the effective surface of said first surface where the transmitting and reflecting regions overlap each other is total reflection.

6. A decentered prism optical system according to claim 2, 3, 4 or 5, wherein said rotationally symmetric surface as said first surface is a rotationally symmetric aspherical surface.

7. A decentered prism optical system according to claim 2, 3, 4 or 5, wherein said second surface is an anamorphic surface.

8. A decentered prism optical system according to claim 7, wherein said first surface and said second surface are disposed such that an axis of rotational symmetry of said rotationally symmetric surface as said first surface lies in at least one of two planes of symmetry of said anamorphic surface.

9. A decentered prism optical system according to claim 4, wherein said second surface is a rotationally asymmetric surface having only one plane of symmetry.

10. A decentered prism optical system according to claim 2, 3, 5 or 9, wherein said first surface and said second surface are disposed such that an axis of rotational symmetry of said rotationally symmetric surface as said first surface lies in the plane of symmetry of said rotationally asymmetric surface having only one plane of symmetry.

11. A decentered prism optical system according to claim 2, 3 or 4, wherein said first surface, said second surface and said third surface are arranged such that a bundle of light rays enters said optical system through said third surface, the bundle of light rays is reflected by said first surface, and the bundle of light rays reflected by said first surface is reflected by said second surface so as to exit from said first surface.

12. A decentered prism optical system according to claim 11, which is used in an image observation apparatus wherein said third surface is disposed at a position where a bundle of light rays from an image display device enters said optical system, and said first surface is disposed at such a position that the bundle of light rays exiting from said first surface is led to an observer's eyeball, thereby enabling observation of the image formed by said bundle of light rays.

13. A decentered prism optical system according to claim 2, 3 or 4, wherein said first surface, said second surface and said third surface are disposed such that a bundle of light rays enters said optical system through said first surface and is reflected by said second surface and then reflected by said first surface, and the bundle of light rays reflected by said first surface exits said prism optical system from said third surface.

14. A decentered prism optical system according to claim 13, which is used in an image observation apparatus wherein said first surface is disposed at a position where a bundle of light rays from an object enters said optical system, and said third surface is disposed at such a position that the bundle of light rays exiting from said third surface is led to an observer's eyeball, thereby enabling observation of the image formed by said bundle of light rays.

15. A decentered prism optical system according to claim 13, which is used in a photographic optical apparatus wherein said first surface is disposed at a position where a bundle of light rays from an object enters said optical system, and said third surface is disposed at such a position that the bundle of light rays exiting from said third surface is led to means for receiving an object image, thereby enabling photographing of an object image formed by said bundle of light rays.

16. A decentered prism optical system according to claim 2, 3 or 4, wherein, a Z-axis is defined by a straight line along which an axial principal ray passes through a center of a pupil of said decentered prism optical system until it intersects said first surface, and an axis perpendicularly intersecting the Z-axis in a decentration plane of each surface constituting said decentered prism optical system is defined as a Y-axis, and further an axis perpendicularly intersecting both the Z- and Y-axes is defined as an X-axis, the following condition is satisfied:

$$0.7 < FA < 1.3$$

where FA is Fx/Fy, said Fx and Fy being defined such that, in ray tracing of a light ray which passes through a point that is a slight distance H away from the pupil center in a direction of the X-axis in parallel to said axial principal ray, and which enters said optical system parallel to said axial principal ray, a value obtained by dividing said distance H by an NA of said light ray exiting from said optical system, NA being a value of a sine of an angle formed between said light ray and said axial principal ray, is defined as a focal length Fx in the direction X of an entire optical system, and in ray tracing of a light ray which passes through a point that is the distance H away from the pupil center in a direction of the Y-axis, and which enters said optical system parallel to said axial principal ray, a value obtained by dividing said distance H by an NA of said light ray exiting from said optical system is defined as a focal length Fy in the direction Y of the entire optical system.

17. A decentered prism optical system according to claim 2, 3 or 4, wherein, a Z-axis is defined by a straight line along which an axial principal ray passes through a center of a pupil of said decentered prism optical system until it intersects said first surface, and an axis perpendicularly intersecting the Z-axis in a decentration plane of each surface constituting said decentered prism optical system is defined as a Y-axis, and further an axis perpendicularly intersecting both the Z- and Y-axes is defined as an X-axis, the following condition is satisfied:

$$0.8 < |PxB| < 1.3$$

where PxB is Pxn/Px, said Pxn and Px being defined such that, in ray tracing of a light ray which passes through a point that is a slight distance H away from the pupil center in a direction of the X-axis parallel to said axial principal ray, and which enters said optical system parallel to said axial principal ray, a value obtained by dividing said distance H by an NA of said light ray exiting from said optical system, NA being a value of a sine of an angle formed between said light ray and said axial principal ray, is defined as a focal length Fx in the direction X of an entire optical system, and in ray tracing of a light ray which passes through a point that is the distance H away from the pupil center in a direction of the Y-axis, and which enters said optical system parallel to said axial principal ray, a value obtained by dividing said distance H by an NA of said light ray exiting from said optical system is defined as a focal length Fy in the direction Y of the entire optical system, and that refracting powers in the directions X and Y of said second surface at a position where said axial principal ray strikes said second surface are denoted by Pxn and Pyn, respectively, and reciprocals of said focal lengths Fx and Fy in the directions X and Y are denoted by Px and Py, respectively.

18. A decentered prism optical system according to claim 2, 3 or 4, wherein a Z-axis is defined by a straight line along which an axial principal ray passes through a center of a pupil of said decentered prism optical system until it intersects said first surface, and an axis perpendicularly intersecting the Z-axis in a decentration plane of each surface constituting said decentered prism optical system is defined as a Y-axis, and further an axis perpendicularly intersecting both the Z- and Y-axes is defined as an X-axis, the following condition is satisfied:

$$0.8 < |PyC| < 1.3$$

where PyC is Pyn/Py, said Pyn and Py being defined such that, in ray tracing of a light ray which passes through a point that is a slight distance H away from the pupil center in a direction of the X-axis in parallel to said axial principal ray, and which enters said optical system parallel to said axial principal ray, a value obtained by dividing said distance H by an NA of said light ray exiting from said optical system, NA being a value of a sine of an angle formed between said light ray and said axial principal ray, is defined as a focal length Fx in the direction X of an entire optical system, and in ray tracing of a light ray which passes through a point that is the distance H away from the pupil center in a direction of the Y-axis, and which enters said optical system parallel to said axial principal ray, a value obtained by dividing said distance H by an NA of said light ray exiting from said optical system is defined as a focal length Fy in the direction Y of the entire optical system, and that refracting powers in the directions X and Y of said second surface at a position where said axial principal ray strikes said second surface are denoted by Pxn and Pyn, respectively, and reciprocals of said focal lengths Fx and Fy in the directions X and Y are denoted by Px and Py, respectively.

19. A decentered prism optical system according to claim 2, 3 or 4, wherein a Z-axis is defined by a straight line along which an axial principal ray passes through a center of a pupil of said decentered prism optical system until it intersects said first surface, and an axis perpendicularly intersecting the Z-axis in a decentration plane of each surface constituting said decentered prism optical system is defined as a Y-axis, and further an axis perpendicularly intersecting both the Z- and Y-axes is defined as an X-axis, the following condition is satisfied:

$$0.8 < CxyD < 1.2$$

where CxyD is a ratio of a curvature Cx2 in an X-axis direction to a curvature Cy2 in a Y-axis direction of said second surface in respective planes containing a line normal to said second surface at a position where said axial principal ray strikes said second surface.

20. A decentered prism optical system according to claim 2, 3 or 4, wherein, a Z-axis is defined by a straight line along which an axial principal ray passes through a center of a pupil of said decentered prism optical system until it intersects said first surface, and an axis perpendicularly intersecting the Z-axis in a decentration plane of each surface constituting said decentered prism optical system is defined as a Y-axis, and further an axis perpendicularly intersecting both the Z- and Y-axes is defined as an X-axis, the following conditions are satisfied:

| $-0.05 < C \times \text{MinE}$ | (1/millimeter) |
|---|---|
| $C \times \text{MaxE} < 0.05$ | (1/millimeter) | where CxMinE and CxMaxE are defined such that, in ray tracing of a light ray which passes through a point that is a slight distance H away from the pupil center in a direction of the X-axis parallel to said axial principal ray, and which enters said optical system parallel to said axial principal ray, a value obtained by dividing said distance H by an NA of said light ray exiting from said optical system, NA being a value of a sine of an angle formed between said light ray and said axial principal ray, is defined as a focal length Fx in the direction X of an entire optical system, and in ray tracing of a light ray which passes through a point that is the distance H away from the pupil center in a direction of the Y-axis, and which enters said optical system parallel to said axial principal ray, a value obtained by dividing said distance H by an NA of said light ray exiting from said optical system is defined as a focal length Fy in the direction Y of the entire optical system, and that reciprocals of said focal lengths Fx and Fy in the directions X and Y are denoted by Px and Py, respectively, and further that a curvature in the direction X and a curvature in the direction Y of said second surface in respective planes containing a line normal to said second surface at a position where said axial principal ray strikes said second surface are denoted by Cx2 and Cy2, respectively, and further that an effective area of said second surface is defined by points at which said second surface is struck respectively by a principal ray passing at a field angle zero in the direction X and at a maximum field angle in a positive direction of the Y-axis, a principal ray passing at a field angle zero in the direction X and at a maximum field angle in a negative direction of the Y-axis, a principal ray passing at a maximum field angle in the direction X and at a maximum field angle in a positive direction of the Y-axis, a principal ray passing at the maximum field angle in the direction X and at a field angle zero in the direction y, and a principal ray passing at the maximum field angle in the direction X and at the maximum field angle in the negative direction of the Y-axis, and a curvature in the direction X and a curvature in the direction Y of said effective area at each of positions where said principal rays strike said second surface are denoted by Cxn and Cyn, respectively, and further that maximum and minimum values of (Cxn−Cx2)/Px are denoted by CxMaxE and CxMineE, respectively, and maximum and minimum values of (Cyn−Cy2)/Py are denoted by CyMaxF and CyMinF, respectively.

21. A decentered prism optical system according to claim 2, 3 or 4, wherein, a Z-axis is defined by a straight line along which an axial principal ray passes through a center of a pupil of said decentered prism optical system until it intersects said first surface, and an axis perpendicularly intersecting the Z-axis in a decentration plane of each surface constituting said decentered prism optical system is defined as a Y-axis, and further an axis perpendicularly intersecting both the Z and Y- axes is defined as an X-axis, the following conditions are satisfied:

| | |
|---|---|
| −0.1 < CyMinF | (1/millimeter) |
| CyMaxF < 0.1 | (1/millimeter) | where CyMinF and CyMaxF are defined such that, in ray tracing of a light ray which passes through a point that is a slight distance H away from the pupil center in a direction of the X-axis parallel to said axial principal ray, and which enters said optical system parallel to said axial principal ray, a value obtained by dividing said distance H by an NA of said light ray exiting from said optical system, NA being a value of a sine of an angle formed between said light ray and said axial principal ray, is defined as a focal length Fx in the direction X of an entire optical system, and in ray tracing of a light ray which passes through a point that is the distance H away from the pupil center in a direction of the Y-axis, and which enters said optical system parallel to said axial principal ray, a value obtained by dividing said distance H by an NA of said light ray exiting from said optical system is defined as a focal length Fy in the direction Y of the entire optical system, and that reciprocals of said focal lengths Fx and Fy in the directions X and Y are denoted by Px and Py, respectively, and further that a curvature in the direction X and a curvature in the direction Y of said second surface in respective planes containing a line normal to said second surface at a position where said axial principal ray strikes said second surface are denoted by Cx2 and Cy2, respectively, and further that an effective area of said second surface is defined by points at which said second surface is struck respectively by a principal ray passing at a field angle zero in the direction X and at a maximum field angle in a positive direction of the Y-axis, a principal ray passing at a field angle zero in the direction X and at a maximum field angle in a negative direction of the Y-axis, a principal ray passing at a maximum field angle in the direction X and at a maximum field angle in a positive direction of the Y-axis, a principal ray passing at the maximum field angle in the direction X and at a field angle zero in the direction Y, and a principal ray passing at the maximum field angle in the direction X and at the maximum field angle in the negative direction of the Y-axis, and a curvature in the direction X and a curvature in the direction Y of said effective area at each of positions where said principal rays strike said second surface are denoted by Cxn and Cyn, respectively, and further that maximum and minimum values of (Cxn−Cx2/Px are denoted by CxMaxE and CxMinE, respectively, and maximum and minimum values of (Cyn−Cy2)/Py are denoted by CyMaxF and CyMinF, respectively.

22. A decentered prism optical system according to claim 2, 3 or 4, wherein, a Z-axis is defined by a straight line along which an axial principal ray passes through a center of a pupil of said decentered prism optical system until it intersects said first surface, and an axis perpendicularly intersecting the Z-axis in a decentration plane of each surface constituting said decentered prism optical system is defined as a Y-axis, and further an axis perpendicularly intersecting both the Z- and Y-axes is defined as an X-axis, the following condition is satisfied:

$$-0.05 < CyG < 0.5$$

where CyG is defined such that, in ray tracing of a light ray which passes through a point that is a slight distance H away from the pupil center in a direction of the X-axis parallel to said axial principal ray, and which enters said optical system parallel to said axial principal ray, a value obtained by dividing said distance H by an NA of said light ray exiting from said optical system, NA being a value of a sine of an angle formed between said light ray and said axial principal ray, is defined as a focal length Fx in the direction X of an entire optical system, and in ray tracing of a light ray which passes through a point that is the distance H away from the pupil center in a direction of the Y-axis, and which enters said optical system in parallel to said axial principal ray, a value obtained by dividing said distance H by an NA of said light ray exiting from said optical system is defined by a focal length Fy in the direction Y of the entire optical system, and that reciprocals of said focal lengths Fx and Fy in the directions X and Y are denoted by Px and Py, respectively, and further that Cy1 denotes a curvature in the direction Y of an effective area of said second surface at a position where said second surface is struck by a principal ray passing at a field angle zero in the direction X and at a maximum field angle in a positive direction of the Y-axis, and Cy3 denotes a curvature in the direction Y of the effective area of said second surface at a position where said second surface is struck by a principal ray passing at a field angle zero in the direction X and at a maximum field angle in a negative direction of the Y-axis, and further that a value obtained by dividing a difference between the curvatures Cy1 and Cy3 by said Py is defined as CyG.

23. A decentered prism optical system according to claim 2, 3 or 4, wherein a Z-axis is defined by a straight line along which an axial principal ray passes through a center of a pupil of said decentered prism optical system until it intersects said first surface, and an axis perpendicularly intersecting the Z-axis in a decentration plane of each surface constituting said decentered prism optical system is defined as a Y-axis, and further an axis perpendicularly intersecting both the Z- and Y-axes is defined as an X-axis, the following condition is satisfied:

$$-0.01 < CxH < 0.1$$

where CxH is defined such that, in ray tracing of a light ray which passes through a point that is a slight distance H away from the pupil center in a direction of the X-axis parallel to said axial principal ray, and which enters said optical system parallel to said axial principal ray, a value obtained by dividing said distance H by an NA of said light ray exiting from said optical system, NA being a value of a sine of an angle formed between said light ray and said axial principal ray, is defined as a focal length Fx in the direction X of an entire optical system, and in ray tracing of a light ray which passes through a point that is the distance H away from the pupil center in a direction of the Y-axis, and which enters said optical system parallel to said axial principal ray, a value obtained by dividing said distance H by an NA of said light ray exiting from said optical system is defined as a focal length Fy in the direction Y of the entire optical system, and that reciprocals of said focal lengths Fx and Fy in the directions X and Y are denoted by Px and Py, respectively, and further that Cx1 denotes a curvature in the direction X of an effective area of said second surface at a position where said second surface is struck by a principal ray passing at a field angle zero in the direction X and at a maximum field angle in a positive direction of the Y-axis, and Cx3 denotes a curvature in the direction X of the effective area of said second surface at a position where said second surface is struck by a principal ray passing at a field angle zero in the direction X and at a maximum field angle in a negative direction of the Y-axis, and further that a value obtained by dividing a difference between the curvatures Cx1 and Cx3 by said Px is defined as CxH.

24. A decentered prism optical system according to claim 2, 3 or 4, wherein a Z-axis is defined by a straight line along which an axial principal ray passes through a center of a pupil of said decentered prism optical system until it intersects said first surface, and an axis perpendicularly intersecting the Z-axis in a decentration plane of each surface constituting said decentered prism optical system is defined as a Y-axis, and further that an axis perpendicularly intersecting both the Z- and Y-axes is defined as an X-axis, the following condition is satisfied:

$$0 < CyI < 5$$

where CyI is defined such that, in ray tracing of a light ray which passes through a point that is a slight distance H away from the pupil center in a direction of the X-axis parallel to said axial principal ray, and which enters said optical system parallel to said axial principal ray, a value obtained by dividing said distance H by an NA of said light ray exiting from said optical system, NA being a value of a sine of an angle formed between said light ray and said axial principal ray, is defined as a focal length Fx in the direction X of an entire optical system, and in ray tracing of a light ray which passes through a point that is the distance H away from the pupil center in a direction of the Y-axis, and which enters said optical system parallel to said axial principal ray, a value obtained by dividing said distance H by an NA of said light ray exiting from said optical system, NA being a value of a sine of an angle formed between said light ray and said axial principal ray, is defined as a focal length Fy in the direction Y of the entire optical system, and that reciprocals of said focal lengths Fx and Fy in the directions X and Y are denoted by Px and Py, respectively, and further that Cy1 denotes a curvature in the direction Y of an effective area of said third surface at a position where said third surface is struck by a principal ray passing at a field angle zero in the direction X and at a maximum field angle in a positive direction of the Y-axis, and Cy3 denotes a curvature in the direction Y of the effective area of said third surface at a position where said third surface is struck by a principal ray passing at a field angle zero in the direction X and at a maximum field angle in a negative direction of the Y-axis, and further that a value obtained by dividing a difference between the curvatures Cy1 and Cy3 by said Py is defined as CyI.

25. A decentered prism optical system according to claim 2, 3 or 4, wherein, a Z-axis is defined by a straight line along which an axial principal ray passes through a center of a pupil of said decentered prism optical system until it intersects said first surface, and an axis perpendicularly intersecting the Z-axis in a decentration plane of each surface constituting said decentered prism optical system is defined as a Y-axis, and further an axis perpendicularly intersecting both the Z- and Y-axes is defined as an X-axis, the following condition is satisfied:

$$0 < CxJ < 1 \qquad (J\text{-}1)$$

where CxJ is defined such that, in ray tracing of a light ray which passes through a point that is a slight distance H away from the pupil center in a direction of the X-axis parallel to said axial principal ray, and which enters said optical system parallel to said axial principal ray, a value obtained by dividing said distance H by an NA of said light ray exiting from said optical system, NA being a value of a sine of an angle formed between said light ray and said axial principal ray, is defined as a focal length Fx in the direction X of an entire optical system, and in ray tracing of a light ray which passes through a point that is the distance H away from the pupil center in a direction of the Y-axis, and which enters said optical system parallel to said axial principal ray, a value obtained by dividing said instance H by an NA of said light ray exiting from said optical system, NA being a value of a sine of an angle formed between said light ray and said axial principal ray, is defined as a focal length Fy in the direction Y of the entire optical system, and that reciprocals of said focal lengths Fx and Fy in the directions X and Y are denoted by Px and Py, respectively, and further that Cx1 denotes a curvature in the direction X of an effective area of said third surface at a position where said third surface is struck by a principal ray passing at a field angle zero in the direction X and at a maximum field angle in a positive direction of the Y-axis, and Cx3 denotes a curvature in the direction X of the effective area of said third surface at a position where said third surface is struck by a principal ray passing at a field angle zero in the direction X and at a maximum field angle in a negative direction of the Y-axis, and further that a value obtained by dividing a difference between the curvatures Cx1 and Cx3 by said Px is defined as CxJ.

26. A decentered prism optical system according to claim 2 or 3, wherein said first surface is arranged such that at least an effective surface having an area that transmits and/or reflects a bundle of light rays in an entire area of the effective surface of said first surface is formed from a rotationally symmetric spherical surface having an axis of rotational symmetry in the effective surface, and the following condition is satisfied:

$$5° < \alpha < 30°$$

where $\alpha$ is a tilt angle of the surface of intersection between a rotation center axis of said symmetric spherical surface, which passes through a point at which an axial principal ray passing through a center of a pupil of said optical system is reflected by said first surface, and a straight line along which said axial principal ray travels after exiting from said pupil until it intersects said first surface.

27. A decentered prism optical system according to claim 1, wherein said rotationally symmetric surface and said rotationally asymmetric surface having only one plane of symmetry are disposed such that the axis of rotational symmetry is positioned in a plane of symmetry of said rotationally asymmetric surface having only one plane of symmetry.

28. A decentered prism optical system according to claim 1, wherein said rotationally symmetric surface is a rotationally symmetric aspheric surface.

29. In a decentered prism optical system having at least three surfaces decentered with respect to each other, wherein a space between said at least three surfaces is filled with a transparent medium having a refractive index not smaller than 1.3, and wherein a bundle of light rays from an image plane is received to form an exit pupil, the improvement wherein said optical system comprises at least a first surface formed from a rotationally symmetric aspheric surface having both a transmitting action through which the bundle of light rays entering said optical system exits from said optical system and a reflecting action by which said bundle of light rays is bent in said optical system; a second surface formed from a rotationally asymmetric surface disposed to face said first surface and having an action by which the bundle of light rays entering said optical system is reflected toward said first surface in said optical system; and a third surface disposed to face said image plane and having an action through which the bundle of light rays from said image plane enters said optical system, wherein said third surface is disposed to face in a direction approximately perpendicular to a direction in which said first surface and said second surface face each other, wherein said first surface has a convex surface directed toward said second surface, wherein said first surface, said second surface and said third surface are arranged to constitute said optical system such that at least the bundle of light rays entering said optical system through said third surface passes through an inside of said optical system and is reflected by said first surface, and the bundle of light rays reflected by said first surface passes through the inside of said optical system and is reflected by said second surface so as to exit from said first surface, which faces said second surface, toward the exit pupil, and wherein said first surface is tilted with respect to a straight line along which an axial principal ray emanating from a center of the image plane of said optical system and reaching a center of the exit pupil travels after exiting from said first surface until it enters said exit pupil in a ZY-plane in which light rays are folded such that a distance from said exit pupil to said first surface in a direction parallel to said straight line is shorter at an image plane side of said straight line than at a side of said straight line remote from said image plane.

30. In a decentered prism optical system having at least three surfaces decentered with respect to each other, wherein a space between said at least three surfaces is filled with a transparent medium having a refractive index not smaller than 1.3, and wherein a bundle of light rays from a pupil plane is received to form an image plane, the improvement wherein said optical system comprises at least a first surface formed from a rotationally symmetric aspheric surface disposed to face said pupil plane and having both a transmitting action through which the bundle of light rays from said pupil plane enters said optical system and a reflecting action by which said bundle of light rays is bent in said optical system; a second surface formed from a rotationally asymmetric surface disposed to face said first surface and having an action by which the bundle of light rays entering said optical system is reflected toward said first surface in said optical system; and a third surface disposed to face in a direction approximately perpendicular to a direction in which said first surface and said second surface face each other and having a transmitting action through which the bundle of light rays entering said optical system exits toward said image plane, wherein said first surface has a convex surface directed toward said second surface, and wherein said first surface, said second surface and said third surface are arranged to constitute said optical system such that at least the bundle of light rays entering said optical system through said first surface is reflected by said second surface, which faces said first surface, and then reflected by said first surface, which faces said second surface, and the bundle of light rays reflected by said first surface exits from said third surface toward said image plane, and wherein said first surface is tilted with respect to a straight line along which an axial principal ray passing through a center of the pupil plane of said optical system and reaching a center of the image plane travels after exiting from said pupil plane until it intersects said first surface in a YZ-plane in which light rays are folded such that a distance from said pupil plane to said first surface in a direction parallel to said straight line is shorter at an image plane side of said straight line than at a side of said straight line remote from said image plane.

31. A decentered prism optical system comprising at least three surfaces which are decentered with respect to each other, wherein a space between said at least three surfaces is filled with a transparent medium having a refractive index not smaller than 1.3, wherein at least two of said at least three surfaces are reflecting surfaces arranged so that at least two internal reflections take place in said optical system, wherein said at least two reflecting surfaces are disposed such that light rays reflected by these surfaces do not intersect each other in said optical system, wherein one of said at least two reflecting surfaces is a rotationally asymmetric surface having no axis of rotational symmetry, and at least one other of said reflecting surfaces is arranged such that at least an effective surface thereof having an area that transmits and/or reflects a bundle of light rays in an entire area of the effective surface is formed from a rotationally symmetric surface having an axis of rotational symmetry intercepting the effective surface, wherein said at least three surfaces include at least a first surface, a second surface, and a third surface, wherein said first surface has both a transmitting action through which a bundle of light rays enters said optical system or exits therefrom after passing through said first surface, and a reflecting action by which said bundle of light rays is bent in said optical system, said first surface being said rotationally symmetric surface, wherein said second surface is disposed to face said first surface, said second surface being said rotationally asymmetric surface, wherein said third surface has a transmitting action through which said bundle of light rays exits from said optical system after passing through said third surface or enters said third surface, said third surface being disposed to face in a direction approximately perpendicular to a direction in which said first surface and said second surface face each other, wherein said first surface, said second surface and said third surface are disposed such that a bundle of light rays enters said optical system through said first surface and is reflected by said second surface and then reflected by said first surface, and the bundle of light rays reflected by said first surface exits said prism optical system from said third surface, and said decentered prism optical system being used in a photographic optical apparatus wherein said first surface is disposed at a position where a bundle of light rays from an object enters said optical system, and said third surface is disposed at such a position that the bundle of light rays exiting from said third surface is led to means for receiving an object image, thereby enabling photographing of an object image formed by said bundle of light rays.

32. In a decentered prism optical system consisting of a one-element prism having at least three surfaces decentered with respect to each other, wherein a space between said at least three surfaces is filled with a transparent medium having a refractive index not smaller than 1.3, and wherein a bundle of light rays from an image plane is received to form an exit pupil, the improvement wherein said optical system comprises at least a first surface formed from a rotationally symmetric surface having both a transmitting action through which the bundle of light rays entering said optical system exits from said optical system and a reflecting action by which said bundle of light rays is bent in said optical system; a second surface formed from a rotationally asymmetric surface disposed to face said first surface and having an action by which the bundle of light rays entering said optical system is reflected toward said first surface in said optical system; and a third surface disposed to face said image plane and having an action through which the bundle of light rays from said image plane enters said optical system, wherein said third surface is disposed to face in a direction approximately perpendicular to a direction in which said first surface and said second surface face each other, and wherein said first surface has a convex surface directed toward said second surface, and wherein said first surface, said second surface and said third surface are arranged to constitute said optical system such that at least the bundle of light rays entering said optical system through said third surface passes through an inside of said optical system and is reflected by said first surface, and the bundle of light rays reflected by said first surface passes through the inside of said optical system and is reflected by said second surface so as to exit from said first surface, which faces said second surface, toward the exit pupil, and wherein said first surface is tilted with respect to a straight line along which an axial principal ray emanating from a center of the image plane of said optical system and reaching a center of the exit pupil travels after exiting from said first surface until it enters said exit pupil in a ZY-plane in which light rays are folded such that a distance from said exit pupil to said first surface in a direction parallel to said straight line is shorter at an image plane side of said straight line than at a side of said straight line remote from said image plane.

33. In a decentered prism optical system consisting of a one-element prism having at least three surfaces decentered with respect to each other, wherein a space between said at least three surfaces is filled with a transparent medium having a refractive index not smaller than 1.3, and wherein a bundle of light rays from a pupil plane is received to form an image plane, the improvement wherein said optical system comprises at least a first surface formed from a rotationally symmetric surface disposed to face said pupil plane and having both a transmitting action through which the bundle of light rays from said pupil plane enters said optical system and a reflecting action by which said bundle of light rays is bent in said optical system; a second surface formed from a rotationally asymmetric surface disposed to face said first surface and having an action by which the bundle of light rays entering said optical system is reflected toward said first surface in said optical system; and a third surface disposed to face in a direction approximately perpendicular to a direction in which said first surface and said second surface face each other and having a transmitting action through which the bundle of light rays entering said optical system exits toward said image plane, wherein said first surface has a convex surface directed toward said secondsurface, and wherein said first surface, said second surface and said third surface are arranged to constitute said optical system such that at least the bundle of light rays entering said optical system through said first surface is reflected by said second surface, which faces said first surface, and then reflected by said first surface, which faces said second surface, and the bundle of light rays reflected by said first surface passes through an inside of said optical system and exits from said third surface toward said image plane, and wherein said first surface is tilted with respect to a straight line along which an axial principal ray passing through a center of the pupil plane of said optical system and reaching a center of the image plane travels after exiting from said pupil plane until it intersects said first surface in a YZ-plane in which light rays are folded such that a distance from said pupil plane to said first surface in a direction parallel to said straight line is shorter at an image plane side of said straight line than at a side of said straight line remote from said image plane.

* * * * *